United States Patent
Sawada et al.

(10) Patent No.: US 8,039,987 B2
(45) Date of Patent: Oct. 18, 2011

(54) POWER SOURCE DEVICE AND VEHICLE WITH POWER SOURCE DEVICE

(75) Inventors: Hiroki Sawada, Toyota (JP); Yoshinori Fujitake, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 366 days.

(21) Appl. No.: 12/310,657

(22) PCT Filed: Aug. 3, 2007

(86) PCT No.: PCT/JP2007/065683
§ 371 (c)(1),
(2), (4) Date: Mar. 3, 2009

(87) PCT Pub. No.: WO2008/041418
PCT Pub. Date: Apr. 10, 2008

(65) Prior Publication Data
US 2010/0060080 A1    Mar. 11, 2010

(30) Foreign Application Priority Data

Sep. 29, 2006 (JP) ................................. 2006-267259

(51) Int. Cl.
*B60L 1/00* (2006.01)
(52) U.S. Cl. ........................................................ 307/9.1
(58) Field of Classification Search .................. 307/9.1, 307/64–66; 320/110, 124, 138
See application file for complete search history.

(56) References Cited

U.S. PATENT DOCUMENTS

| 7,352,154 | B2 * | 4/2008 | Cook | 320/116 |
| 7,688,029 | B2 * | 3/2010 | Hoffman | 320/114 |
| 7,745,025 | B2 * | 6/2010 | Leach et al. | 429/9 |
| 7,839,121 | B2 * | 11/2010 | Kim | 320/124 |

FOREIGN PATENT DOCUMENTS

| JP | A-61-76034 | 4/1986 |
| JP | A-8-107608 | 4/1996 |
| JP | A-9-233710 | 9/1997 |
| JP | A-2000-175368 | 6/2000 |
| JP | A-2001-157384 | 6/2001 |
| JP | A-2002-10502 | 1/2002 |
| JP | A-2005-57826 | 3/2005 |
| JP | A-2005-229733 | 8/2005 |
| JP | A-2006-6033 | 1/2006 |
| RU | 2 025 862 C1 | 12/1994 |

OTHER PUBLICATIONS

Russian Office Action issued in Russian Patent Application No. 2009116280 dated Aug. 25, 2010 (with translation).

* cited by examiner

*Primary Examiner* — Albert W Paladini
(74) *Attorney, Agent, or Firm* — Oliff & Berridge, PLC

(57) ABSTRACT

A power source device includes first and second rechargeable batteries, a load circuit, a first step-up converter converting voltage between a first node to which the first battery is connected and a second node to which the load circuit is connected, a second step-up converter converting voltage between a third node to which the second battery is connected and the second node, and a charge/discharge unit transmitting power received from an external power source. Preferably, the power source device further includes a first system main relay, a second system main relay, and a controller controlling the first and second system main relays and the first and second step-up converters.

32 Claims, 15 Drawing Sheets

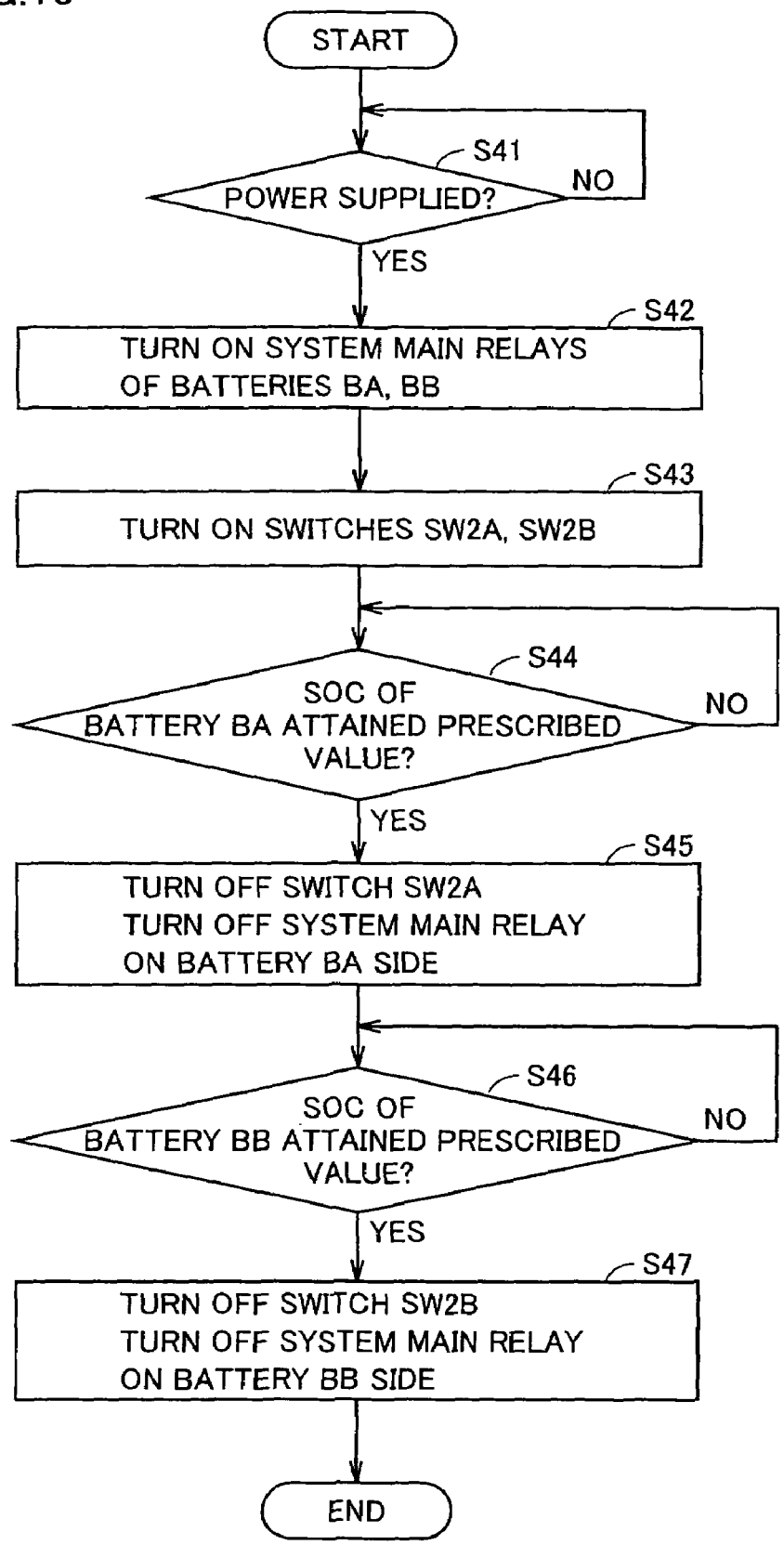

US 8,039,987 B2

POWER SOURCE DEVICE AND VEHICLE WITH POWER SOURCE DEVICE

TECHNICAL FIELD

The present invention relates to a power source device and a vehicle with the power source device.

BACKGROUND ART

Recently, environmentally friendly vehicles including an electric vehicle, a fuel cell vehicle and a hybrid vehicle using both motor and engine have attracting attention. Mounting a plurality of batteries on such a vehicle that has a power source device mounted thereon has also been proposed.

In designing such a vehicle, a method of charging the plurality of batteries must also be considered. Various proposals have been made in relation to the method of charging a plurality of batteries.

By way of example, Japanese Patent Laying-Open No. 9-233710 discloses a charge/discharge device capable of individually charging and discharging a plurality of storage batteries. The charge/discharge device includes a charge rectifying circuit for rectifying an AC power source, a regeneration rectifying circuit connected anti-parallel to the charge rectifying circuit, for regenerating electricity of the storage batteries divided into a plurality of numbers to the AC power source, and a plurality of step-up/down converters provided corresponding to the plurality of storage batteries, respectively. Each of the plurality of step-up/down converters is used as a step-down converter when the storage battery is charged, and used as a step-up converter when the storage battery is discharged.

In the charge/discharge device described in Japanese Patent Laying-Open No. 9-233710, charging of a storage battery is difficult unless the output voltage of the charge rectifying circuit is made higher than the voltage across terminals of the storage battery. In order to solve this problem, it is necessary to use a power source device capable of outputting a high voltage, or to provide a voltage boosting circuit between the AC power source and the charge rectifying circuit.

When a plurality of storage batteries mounted on a vehicle are to be charged using the technique described in the laid-open application mentioned above, it may be possible to use a high-voltage power source or to connect a boosting circuit between a commercial power source for home use and the storage battery. According to these methods, however, a dedicated charging device, for example, becomes necessary. This undesirably increases the number of components of a vehicle. Further, an operation of connecting the charging device becomes necessary and, hence, increased burden on the user is expected.

DISCLOSURE OF THE INVENTION

An object of the present invention is to provide a power source device enabling easy execution of charging from outside, and to provide a vehicle with such a power source device.

In short, the present invention provides a power source device charged by an external power source, including: a first power storage device chargeable and dischargeable, and connected to a first node; a load connected to a second node; a first voltage converting unit converting voltage between the first node and the second node; a second power storage device chargeable and dischargeable, and connected to a third node; a second voltage converting unit converting voltage between the third node and the second node; and a power transmitting unit transmitting power received from the external power source to the first node.

Preferably, the power source device further includes a first connecting unit capable of shutting off connection between the first power storage device and the first node; a second connecting unit capable of shutting off connection between the second power storage device and the third node; and a control unit controlling the first and second connecting units and the first and second voltage converting units. The control unit sets the first and second connecting units to shut-off and connected states, respectively, controls the first and second voltage converting units such that voltage of the third node attains to a desired charge voltage and thereby charges the second power storage device.

More preferably, the external power source is a DC power source. The power transmitting unit transmits a DC voltage from the DC power source to the first node.

More preferably, the external power source is an AC power source. The power transmitting unit includes a converting circuit converting an AC voltage output from the AC power source to a DC voltage.

More preferably, the power transmitting unit is capable of selecting a connection destination from the first and third nodes. The control unit sets, when the power transmitting unit is connected to the third node, the first and second connecting units to connected and shut-off states, respectively, controls the first and second voltage converting units such that voltage of the first node attains to a desired charging voltage and thereby charges the first power storage device.

More preferably, the power source device further includes a switching unit controlled by the control unit to switch connection destination of the power transmitting unit between the first and third nodes.

More preferably, storage capacity of the first power storage device is smaller than that of the second power storage device.

More preferably, after charging of the second power storage device ends, the control unit sets the first connecting unit to the connected state and controls the first and second voltage converting units such that power stored in the second power storage device is supplied to the first power storage device, and thereby charges the first power storage device.

More preferably, the control unit sets the first and second connecting units to connected and shut-off states, respectively, and thereby charges the first power storage device.

More preferably, storage capacity of the first power storage device is larger than that of the second power storage device.

More preferably, each of the first and second power storage devices has a positive electrode and a negative electrode. The first connecting unit connects the positive electrode of the first power storage device to the first node. The second connecting unit connects the positive electrode of the second power storage device to the third node. The power source device further includes: a ground line; a third connecting unit connecting the ground line to the negative electrode of the first power storage device; and a fourth connecting unit connecting the ground line to the negative electrode of the second power storage device. The power transmitting unit includes a first output line connected to the first node, and a second output line connected to the negative electrode of the first power storage device.

More preferably, an external load using power from at least one of the first and second power storage devices is connected to the power transmitting unit in place of the external power source. The control unit sets at least one of the first and second connecting units to the selected state and thereby supplies power from the power storage device corresponding to the at least one connecting unit, of the first and second power storage devices, to the external load.

Preferably, the power source device further includes a switching unit switching connection destination of the power transmitting unit between the first and third nodes.

Preferably, each of the first and second power storage devices has a positive electrode and a negative electrode. The positive electrodes of the first and second power storage devices are connected to the first and third nodes, respectively. The power transmitting unit has a first output line, and a second output line connected to the negative electrode of the first power storage device. The power source device further includes: a first switching unit switching connection and disconnection between the first output line and the first node; a second switching unit switching connection and disconnection between the first output line and the third node; and a control unit controlling the first and second switching units. The control unit sets both the first and second switching units to the connected state, and thereby charges the first and second power storage devices.

Preferably, storage capacity of the first power storage device is larger than that of the second power storage device. When state of charge of the second power storage device attains to a prescribed state, the control unit sets the second switching unit to the disconnected state and ends charging of the second power storage device.

According to another aspect, the present invention provides a vehicle, including a power source device charged by an external power source provided outside the vehicle. The power source device includes: a first power storage device chargeable and dischargeable, and connected to a first node; a load connected to a second node; a first voltage converting unit converting voltage between the first node and the second node; a second power storage device chargeable and dischargeable, and connected to a third node; a second voltage converting unit converting voltage between the third node and the second node; and a power transmitting unit transmitting power received from the external power source to the first node.

Preferably, the power source device further includes a first connecting unit capable of shutting off connection between the first power storage device and the first node, a second connecting unit capable of shutting off connection between the second power storage device and the third node, and a control unit controlling the first and second connecting units and the first and second voltage converting units. The control unit sets the first and second connecting units to shut-off and connected states, respectively, controls the first and second voltage converting units such that voltage of the third node attains to a desired charge voltage and thereby charges the second power storage device.

More preferably, the external power source is a DC power source. The power transmitting unit transmits a DC voltage from the DC power source to the first node.

More preferably, the external power source is an AC power source. The power transmitting unit includes a converting circuit converting an AC voltage output from the AC power source to a DC voltage.

More preferably, the power transmitting unit is capable of selecting a connection destination from the first and third nodes. The control unit sets, when the power transmitting unit is connected to the third node, the first and second connecting units to connected and shut-off states, respectively, and controls the first and second voltage converting units such that voltage of the first node attains to a desired charging voltage and thereby charges the first power storage device.

More preferably, the power source device further includes a switching unit controlled by the control unit to switch connection destination of the power transmitting unit between the first and third nodes.

Preferably, storage capacity of the first power storage device is smaller than that of the second power storage device.

More preferably, after charging of the second power storage device ends, the control unit sets the first connecting unit to the connected state and controls the first and second voltage converting units such that power stored in the second power storage device is supplied to the first power storage device, and thereby charges the first power storage device.

More preferably, the control unit sets the first and second connecting units to connected and shut-off states, respectively, and thereby charges the first power storage device.

More preferably, storage capacity of the first power storage device is larger than that of the second power storage device.

More preferably, each of the first and second power storage devices has a positive electrode and a negative electrode. The first connecting unit connects the positive electrode of the first power storage device to the first node. The second connecting unit connects the positive electrode of the second power storage device to the third node. The power source device further includes: a ground line; a third connecting unit connecting the ground line to the negative electrode of the first power storage device; and a fourth connecting unit connecting the ground line to the negative electrode of the second power storage device. The power transmitting unit includes a first output line connected to the first node, and a second output line connected to the negative electrode of the first power storage device.

More preferably, an external load using power from at least one of the first and second power storage devices is connected to the power transmitting unit in place of the external power source. The control unit sets at least one of the first and second connecting units to the selected state and thereby supplies power from the power storage device corresponding to the at least one connecting unit, of the first and second power storage devices, to the external load.

Preferably, the power source device further includes a switching unit switching connection destination of the power transmitting unit between the first and third nodes.

Preferably, each of the first and second power storage devices has a positive electrode and a negative electrode. The positive electrodes of the first and second power storage devices are connected to the first and third nodes, respectively. The power transmitting unit has a first output line, and a second output line connected to the negative electrode of the first power storage device. The power source device further includes: a first switching unit switching connection and disconnection between the first output line and the first node; a second switching unit switching connection and disconnection between the first output line and the third node; and a control unit controlling the first and second switching units. The control unit sets both the first and second switching units to the connected state, and thereby charges the first and second power storage devices.

More preferably, storage capacity of the first power storage device is larger than that of the second power storage device. When state of charge of the second power storage device attains to a prescribed state, the control unit sets the second switching unit to the disconnected state and ends charging of the second power storage device.

Therefore, by the present invention, it becomes possible to supply electric power to a vehicle without increasing the number of components, and thereby to charge the power storage device.

BRIEF DESCRIPTION OF THE DRAWINGS

FIG. 15 is a flowchart representing a process for charging by controller 30 shown in FIG. 14.

BEST MODES FOR CARRYING OUT THE INVENTION

Figure 1:
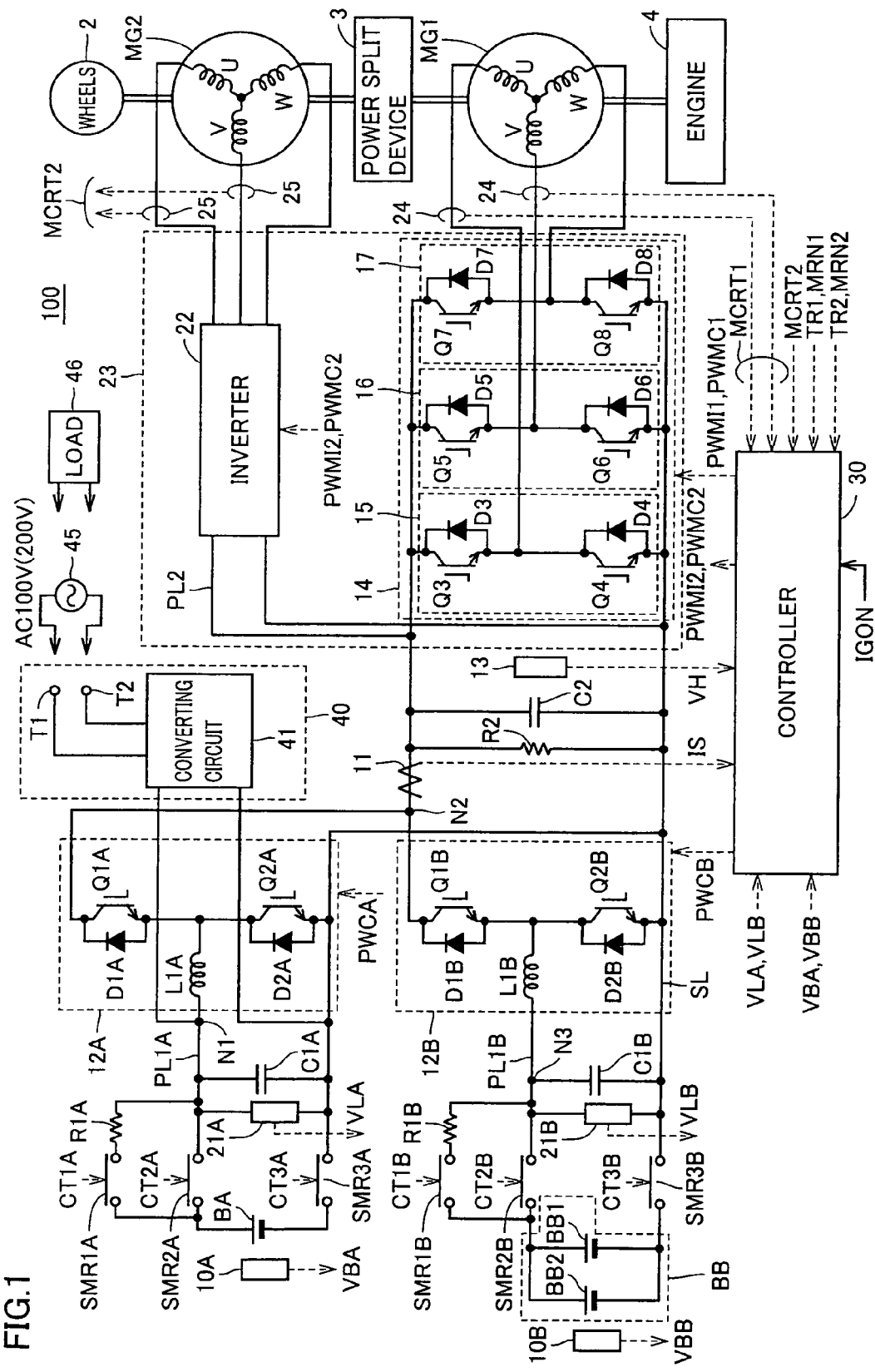
FIG. 1 shows a main configuration of a vehicle 100 in accordance with Embodiment 1 of the present invention.

In the following, embodiments of the present invention will be described in detail with reference to the figures. In the figures, the same or corresponding portions are denoted by the same reference characters and description thereof will not be repeated.

Embodiment 1

FIG. 1 shows a main configuration of a vehicle 100 in accordance with Embodiment 1 of the present invention. Though vehicle 100 is a hybrid vehicle using both motor and engine for driving the vehicle, the present invention is also applicable to an electric vehicle whose wheels are driven by a motor, or to a fuel cell vehicle.

Referring to FIG. 1, vehicle 100 includes batteries BA and BB, step-up converters 12A and 12B, smoothing capacitors C1A, C1B and C2, voltage sensors 13, 21A and 21B, a load circuit 23, an engine 4, motor generators MG1 and MG2, a power split device 3, wheels 2 and a controller 30.

Vehicle 100 further includes power lines PL1A, PL1B and PL2, a ground line SL, a voltage sensor 10A detecting a voltage VBA across terminals of battery BA, and a voltage sensor 10B detecting a voltage VBB across terminals of battery BB.

A secondary battery such as a lead storage battery, a nickel hydride battery, or a lithium ion battery may be used as battery BA or BB. Though the configuration shown in FIG. 1 includes batteries BB1 and BB2, a battery integrating these may be used.

Vehicle 100 further includes system main relays SMR1A, SMR2A, SMR3A, SMR1B, SMR2B and SMR3B. Connected state (ON state)/disconnected state (OFF state) of system main relays SMR1A to SMR3A and SMR1B to SMR3B is controlled in accordance with control signals CT1A to CT3A and CT1B to CT3B, respectively.

System main relay SMR2A is connected between a positive electrode of battery BA and power line PL1A. System main relay SMR3A is connected between a negative electrode of battery BA and ground line SL. System main relay SMR1A is connected in series with a limiting resistor R1A. System main relay SMR1A and limiting resistor R1A are connected between positive electrode of battery BA and power line PL1A, in parallel with system main relay SMR2A.

System main relay SMR2B is connected between positive electrode of battery BB and power line PL1B. System main relay SMR3B is connected between negative electrode of battery BB and ground line SL. System main relay SMR1B is connected in series with limiting resistor R1B. System main relay SMR1B and limiting resistor R1B are connected between the positive electrode of battery BB and power line PL1B, in parallel with system main relay SMR2B.

A smoothing capacitor C1A smoothes voltage across terminals of battery BA, when system main relays SMR1A to SMR3A are on. Smoothing capacitor C1A is connected between power line PL1A and the ground line SL.

Voltage sensor 21A detects a voltage VLA across opposite ends of smoothing capacitor C1A, and outputs the value to controller 30. Step-up converter 12A boosts the voltage across terminals of smoothing capacitor C1A. Voltage sensor 21B detects a voltage VLB across opposite ends of smoothing capacitor C1B, and outputs the value to controller 30. Step-up converter 12B boosts the voltage across terminals of smoothing capacitor C1B.

Smoothing capacitor C2 smoothes the voltage boosted by step-up converters 12A and 12B. Voltage sensor 13 detects a voltage VH as the voltage across terminals of smoothing capacitor C2, and outputs it to controller 30.

Vehicle 100 further includes a discharge resistor R2 connected between power line PL2 and ground line SL, in parallel with smoothing capacitor C2. After the end of power converting operation by vehicle 100, remaining charges in smoothing capacitor C2 are consumed by discharge resistor R2.

Load circuit 23 includes inverters 14 and 22. Inverter 14 converts the DC voltage applied from step-up converters 12A and 12B to three-phase AC, and outputs it to motor generator MG1. Load circuit 23 corresponds to the "load" of the present invention.

Power split device 3 is a mechanism coupled to an engine 4 and motor generators MG1 and MG2, for distributing power among these. By way of example, a planetary gear mechanism having three rotation shafts of sun gear, planetary carrier and ring gear may be used as the power split device. The three rotation shafts are connected to rotation shafts of engine 4 and motor generators MG1 and MG2, respectively.

Rotation shaft of motor generator MG2 is coupled to wheels 2 by a reduction gear and a differential gear, not shown. Further, a reduction mechanism for the rotation shaft of motor generator MG2 may further be incorporated in power split device 3. Further, the reduction ratio of reduction mechanism may be made switchable.

Step-up converter 12A includes a reactor L1A having one end connected to power line P1A, IGBT elements Q1A and Q2A connected in series between power line PL2 and ground line SL, and diodes D1A and D2A connected in parallel with IGBT elements Q1A and Q2A, respectively.

Reactor L1A has the other end connected to the emitter of IGBT element Q1A and to the collector of IGBT element Q2A. Diode D1A has its cathode connected to the collector of IGBT element Q1A and its anode connected to the emitter of IGBT element Q1A. Diode D2A has its cathode connected to the collector of IGBT element Q2A and its anode connected to the emitter of IGBT element Q2A.

Step-up converter 12B includes a reactor L1B having one end connected to power line PL1B, IGBT elements Q1B and Q2B connected in series between power line PL2 and ground line SL, and diodes D1B and D2B connected in parallel with IGBT elements Q1B and Q2B.

Reactor L1B has the other end connected to the emitter of IGBT element Q1B and to the collector of IGBT element Q2B. Diode D1B has its cathode connected to the collector of IGBT element Q1B and its anode connected to the emitter of IGBT element Q1B. Diode D2B has its cathode connected to the collector of IGBT element Q2B and its anode connected to the emitter of IGBT element Q2B.

Inverter 14 receives the boosted voltage from step-up converters 12A and 12B and drives motor generator MG1, for starting, for example, engine 4. Further, inverter 14 returns electric power generated by motor generator MG1 by the power transmitted from engine 4, to step-up converter 12A or 12B. At this time, step-up converter 12A or 12B is controlled by controller 30 such that it operates as a voltage lowering circuit.

Inverter 14 includes a U-phase arm 15, a V-phase arm 16 and a W-phase arm 17. U-phase arm 15, V-phase arm 16 and W-phase arm 17 are connected in parallel, between power line PL2 and ground line SL.

U-phase arm 15 includes IGBT elements Q3 and Q4 connected in series between power line PL2 and the ground line SL, and diodes D3 and D4 connected in parallel with IGBT elements Q3 and Q4, respectively. Diode D3 has its cathode connected to the collector of IGBT element Q3 and its anode connected to the emitter of IGBT element Q3. Diode D4 has its cathode connected to the collector of IGBT element Q4 and its anode connected to the emitter of IGBT element Q4.

V-phase arm 16 includes IGBT elements Q5 and Q6 connected in series between power line PL2 and the ground line SL, and diodes D5 and D6 connected in parallel with IGBT elements Q5 and Q6, respectively. Diode D5 has its cathode connected to the collector of IGBT element Q5, and its anode connected to the emitter of IGBT element Q5. Diode D6 has its cathode connected to the collector of IGBT element Q6 and its anode connected to the emitter of IGBT element Q6.

W-phase arm 17 includes IGBT elements Q7 and Q8 connected in series between power line PL2 and the ground line SL, and diodes D7 and D8 connected in parallel with IGBT elements Q7 and Q8, respectively. Diode D7 has its cathode connected to the collector of IGBT element Q7 and its anode connected to the emitter of IGBT element Q7. Diode D8 has its cathode connected to the collector of IGBT element Q8 and its anode connected to the emitter of IGBT element Q8.

The middle point of the arms of respective phases is connected to one end of coils of respective phases of motor generator MG1. Specifically, motor generator MG1 is a three-phase permanent magnet synchronous motor, and three coils of U, V and W phases each have one end connected together to a midpoint. U-phase coil has the other end connected to a connection node between IGBT elements Q3 and Q4. V-phase coil has the other end connected to a connection node between IGBT elements Q5 and Q6. W-phase coil has the other end connected to a connection node between IGBT elements Q7 and Q8.

In place of IGBT elements Q1A, Q2A, Q1B, Q2B and Q3 to Q8 described above, other power switching elements such as power MOSFETs may be used.

Current sensor 24 detects a current flowing through motor generator MG1 as motor current value MCRT1, and outputs the motor current value MCRT1 to controller 30.

Inverter 22 is connected to power line PL2 and ground line SL. Inverter 22 converts the DC voltage output from step-up converters 12A, 12B to three-phase AC, and outputs the same to motor generator MG2 driving the wheels 2. At regenerative braking, inverter 22 returns electric power generated by motor generator MG2 to step-up converters 12A, 12B. At this time, step-up converters 12A, 12B are controlled by controller 30 such that they operate as voltage lowering circuits. Though not shown, internal configuration of inverter 22 is the same as that of inverter 14 and, therefore, detailed description will not be repeated.

Controller 30 receives torque command values TR1 and TR2, motor rotation numbers MRN1 and MRN2, various values of voltages VLA, VLB, VBA, VBB and VH, current IS detected by current sensor 11, motor current values MCRT1 and MCRT2, and an ignition instruction IGON. Controller 30 outputs a voltage boosting instruction, a voltage lowering instruction, and control signals PWCA and PWCB instructing operation inhibition, to step-up converters 12A and 12B.

Further, controller 30 outputs a drive instruction PWMI1 and regeneration instruction PWMC1 to inverter 14. Drive instruction PWMI1 is an instruction to convert a DC voltage as an output of step-up converter 12A, 12B to an AC voltage for driving motor generator MG1. Regeneration instruction PWMC1 is an instruction to convert the AC voltage generated by motor generator MG1 to a DC voltage and to return the voltage to the side of step-up converters 12A and 12B.

Similarly, controller 30 outputs a drive instruction PWMI2 and regeneration instruction PWMC2. Drive instruction PWMI2 is an instruction to convert a DC voltage to an AC voltage for driving motor generator MG2. Regeneration instruction PWMC2 is to convert the AC voltage generated by motor generator MG2 to a DC voltage and to return the voltage to the side of step-up converters 12A and 12B.

Vehicle 100 further includes a charge/discharge unit 40. Charge/discharge unit 40 includes a converter circuit 41 and terminals T1 and T2. At the time of charging batteries BA and BB, an AC power source 45 is connected to terminals T1 and T2, and an AC voltage of AC 100V (or AC 200V) is supplied across terminals T1 and T2.

Converter circuit 41 converts the AC voltage across terminals T1 and T2 to a DC voltage. The DC voltage output from converter circuit 41 is applied between power line PL1A and ground line SL. Converter circuit 41 is formed, for example, by a rectifying circuit using a diode, an inverter circuit or the like.

In the following, the converter circuit 41 will be described as a rectifying circuit using a diode. Therefore, in the following description, converter circuit 41 will be referred to as a "rectifying element 41."

Storage capacity of battery BB is larger than the storage capacity of battery BA. Specifically, charge/discharge unit 40 is connected to a step-up converter (step-up converter 12A) that corresponds to the one having smaller storage capacity of batteries BA and BB.

Referring to FIG. 1, the present embodiment will be described in a comprehensive manner. The power source device charged by an external power source (AC power source 45) includes rechargeable batteries BA and BB, load circuit 23, step-up converter 12A converting a voltage between a node N1 to which battery BA is connected and a node N2 to which load circuit 23 is connected, step-up converter 12B converting a voltage between a node N3 to which battery BB is connected and node N2, and charge/discharge unit 40 transmitting electric power received from outside to node N1.

Preferably, the power source device further includes system main relay SMR2A capable of shutting off connection between battery BA and node N1, system main relay SMR2B capable of shutting off connection between battery BB and node N3, and controller 30 controlling system main relays SMR1A and SMR2B and step-up converters 12A and 12B. Controller 30 sets system main relays SMR2A and SMR2B to the shut-off state and connected state, respectively, controls system main relays SMR2A and SMR2B such that the voltage at node N3 attains to a desired charging voltage, and thereby charges battery BB.

More preferably, the external power source is an AC power source. Charge/discharge unit 40 includes converter circuit 41 for converting the AC voltage output from AC power source 45 to a DC voltage.

More preferably, it is possible to connect a load 46 to terminals T1 and T2 of charge/discharge unit 40, in place of AC power source 45. Controller 30 sets at least one of system main relays SMR2A and SMR2B to the connected state, and supplies electric power from the battery corresponding to the at least one system main relay (connected system main relay) of batteries BA and BB, to load 46. By way of example, load 46 is an electric appliance for home use.

Figure 2:
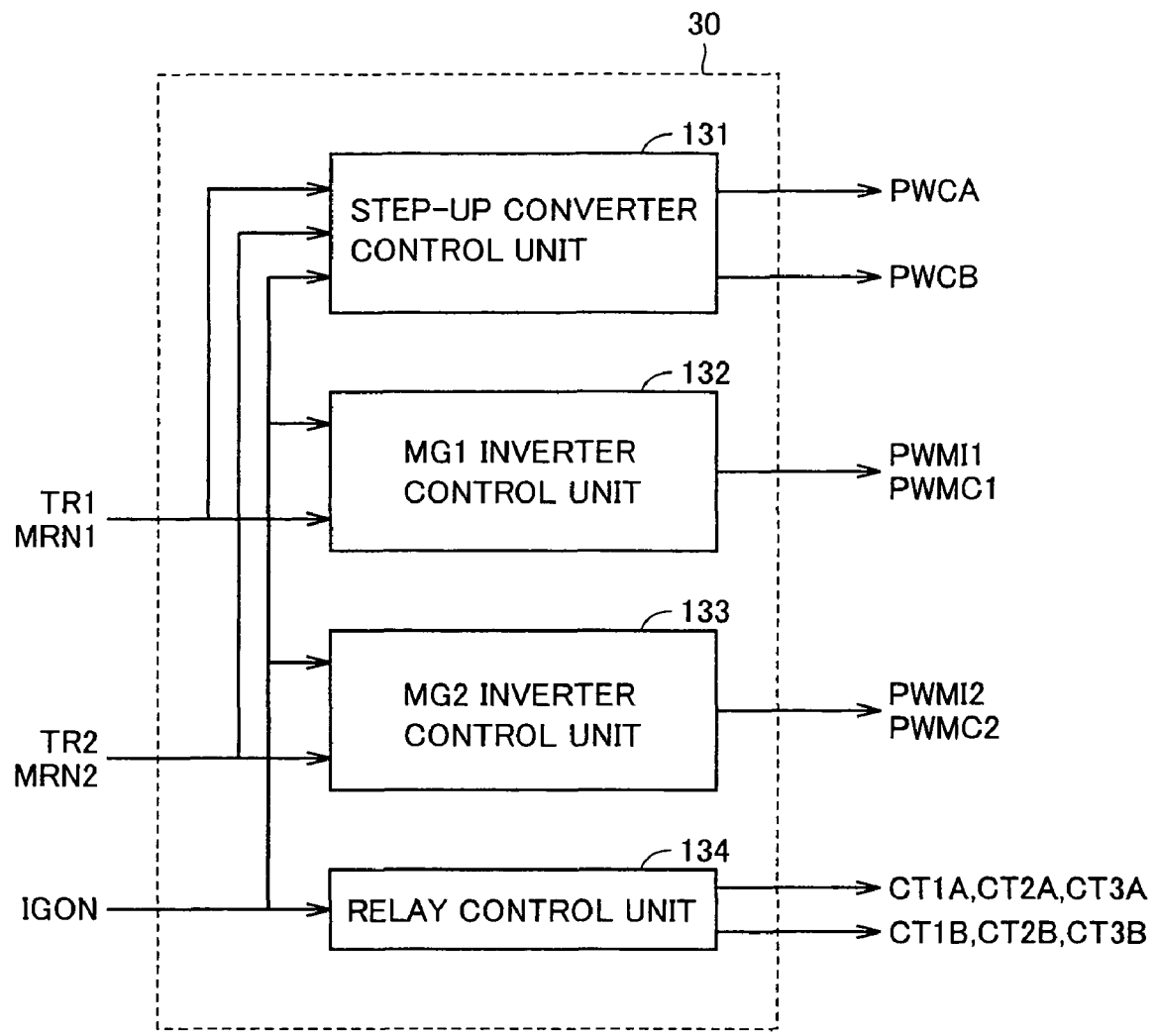
FIG. 2 is a functional block diagram of a controller 30 shown in FIG. 1.

FIG. 2 is a functional block diagram of controller 30 shown in FIG. 1. Controller 30 may be implemented by software or hardware.

Referring to FIGS. 1 and 2, controller 30 includes a step-up converter control unit 131 for controlling step-up converters 12A and 12B, an MG1 inverter control unit 132 for controlling motor generator MG1, an MG2 inverter control unit 133 for controlling motor generator MG2, and a relay control unit 134 for controlling system main relays SMR1A, SMR2A, SMR3A, SMR1B, SMR2B and SMR3B.

In response to ignition instruction IGON, step-up converter control unit 131 becomes operable. Control signals PWCA and PWCB for instructing voltage boosting and voltage lowering, respectively, are output to step-up converters 12A and 12B of FIG. 1, respectively. Further, MG1 inverter control unit 132 outputs drive instruction PWMI1 and regeneration instruction PWMC1 to inverter 14 based on torque command value TR1 and motor rotation number MRN1. Further, MG2 inverter control unit 133 outputs drive instruction PWMI2 and regeneration instruction PWMC2, based on torque command value TR2 and motor rotation number MRN2.

Relay control unit 134 activates control signals CT1A to 3A and CT1B to 3B in response to ignition instruction IGON, whereby batteries BA and BB are electrically connected to step-up converters 12A and 12B, respectively.

[Battery Charging Process]

Figure 3:
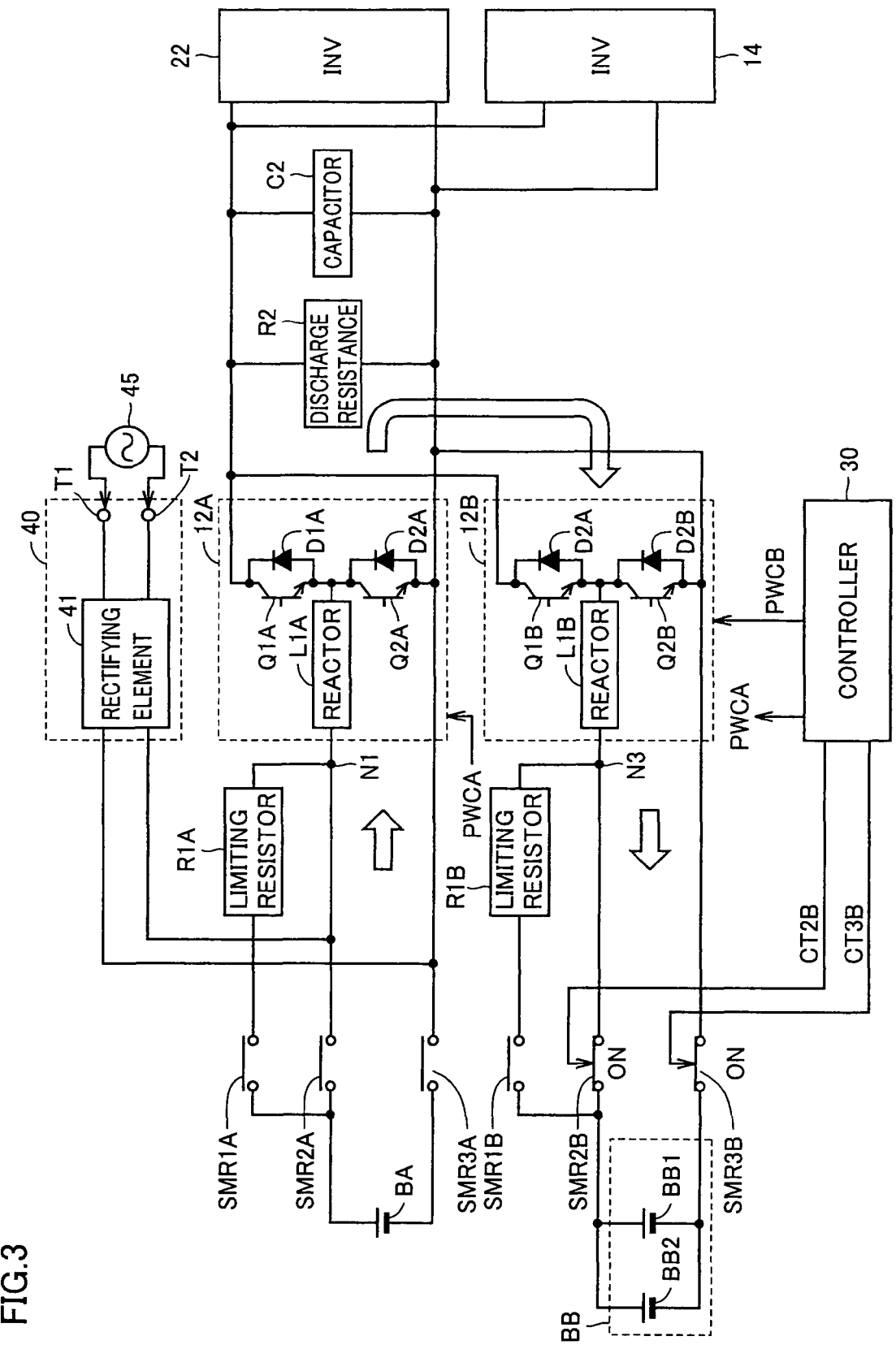
FIG. 3 schematically shows a state in which a battery BB is charged in a vehicle 100 shown in FIG. 1.

FIG. 3 schematically shows a state when battery BB is charged in vehicle 100 shown in FIG. 1.

Referring to FIG. 3, system main relays SMR2B and SMR3B turn on in response to control signals CT2B and CT3B from controller 30, respectively.

The AC voltage from AC power source 45 is converted by rectifying element 41 to a DC voltage. The output voltage from rectifying element 41 is applied to step-up converter 12A. Controller 30 sends control signal PWCA to step-up converter 12A, to operate step-up converter 12A. Consequently, step-up converter 12A boosts an input voltage to a charging voltage of battery BB.

The output voltage of step-up converter 12A is applied to step-up converter 12B. Controller 30 sends control signal PWCB to step-up converter 12B, whereby IGBT elements Q1B and Q2B are turned on and off, respectively. Consequently, an output voltage substantially equal to the input voltage is output from step-up converter 12B.

Therefore, the electric power from AC power source 45 is transmitted to battery BB along the path indicated by an arrow in FIG. 3, and battery BB is charged. Inverters 14 and 22 are stopped.

Figure 4:
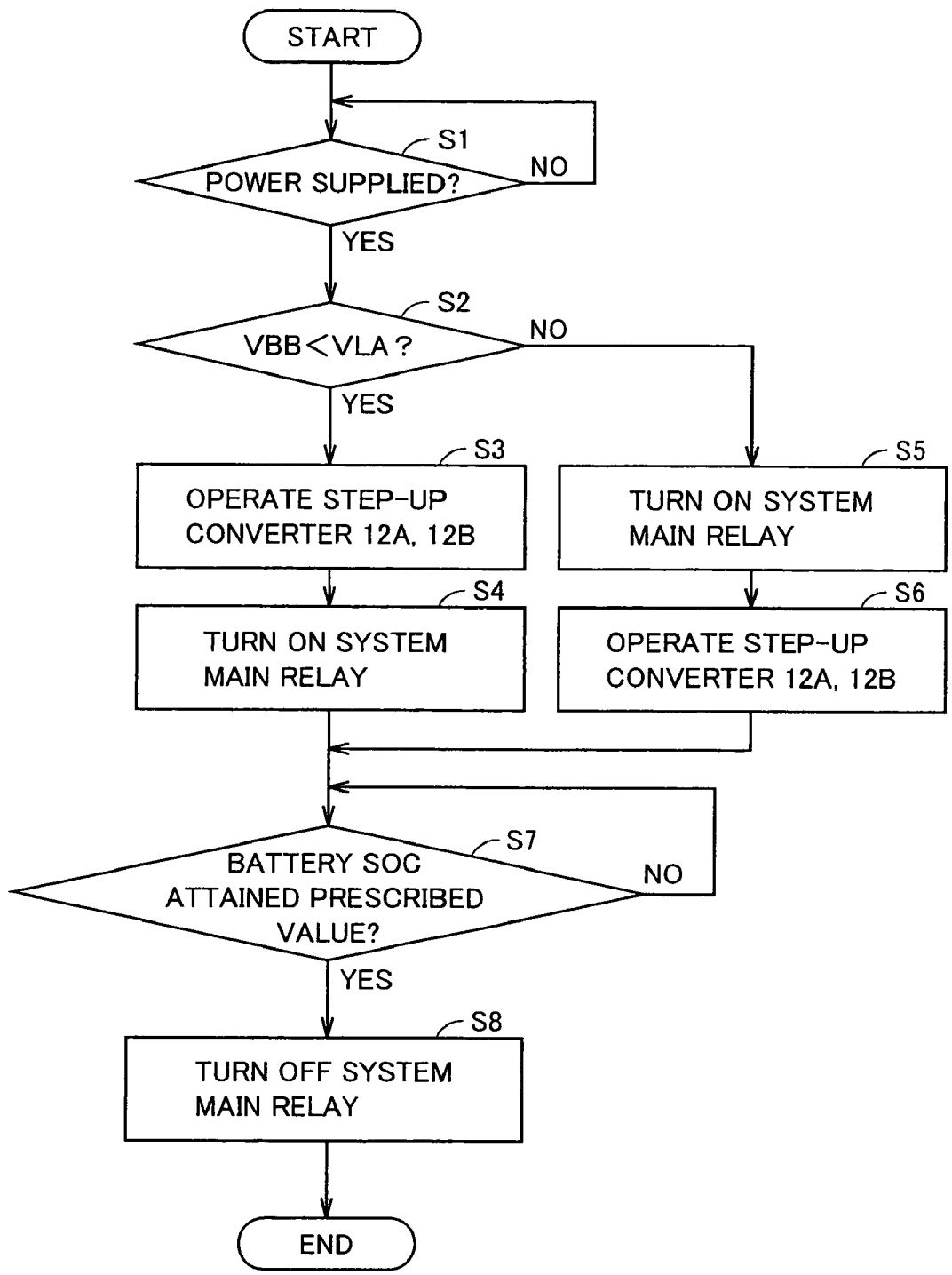
FIG. 4 is a flowchart representing a process for charging battery BB executed by controller 30.

FIG. 4 is a flowchart representing a process for charging battery BB executed by controller 30. The process of the flowchart is called from a prescribed main routine and executed at every prescribed time interval or every time prescribed conditions are satisfied.

Referring to FIGS. 4 and 1, when the process starts, at step S1, controller 30 determines whether or not there is a power supply from AC power source 45. By way of example, if AC power source 45 is connected to terminals T1 and T2 or if a user operates a switch to instruct charging, controller 30 determines that power is supplied.

When there is power supply from AC power source 45 (YES at step S1), the process proceeds to step S2 and otherwise (NO at step S1), the process returns to step S1.

At step S2, controller 30 determines whether the voltage VBB is smaller than the voltage VLA or not, based on outputs of voltage sensors 10B and 21A. If the voltage VBB is smaller than voltage VLA (YES at step S2), the process proceeds to step S3. If the voltage VBB is equal to or larger than voltage VLA (NO at step S2), the process proceeds to step S5.

At step S3, controller 30 operates step-up converters 12A and 12B. Step-up converter 12A boosts the input voltage to the charging voltage of battery BB. In step-up converter 12B, IGBT elements Q1B and Q2B are turned on and off, respectively. As a result, a voltage substantially equal to the voltage VBB of battery BB is output from step-up converter 12B.

Next, at step S4, controller 30 turns on system main relays SMR2B and SMR3B. Consequently, positive electrode and negative electrode of battery BB are connected to power line PL1B (that is, node N3) and ground line SL, respectively.

Here, controller 30 may turn on system main relays SMR2B and SMR3B simultaneously, or it may turn system main relays SMR2B and SRM3B in this order.

Alternatively, at step S4, the system main relays may be controlled in the following manner. First, controller 30 turns on system main relays SMR1B and SMR3B. After a prescribed time period, it turns on system main relay SMR2B and turns off system main relay SMR1B.

When system main relays SMR2B and SMR3B are turned on from a state in which system main relays SMR1B to SMR3B are all off, it is possible that a large current instantaneously flows to system main relays SMR2B and SMR3B. When system main relay SMR1B has been on before turning on system main relay SMR2B, the current flowing through system main relays SMR1B and SMR3B can be limited by limiting resistor RIB. By reducing possibility of large current flow, melting of system main relay can be prevented.

At step S5, controller 30 executes a process similar to that of step S4, to turn on system main relays SMR2B and SMR3B.

At step S6, controller 30 operates step-up converters 12A and 12B. At step S6, controller 30 first turn on and off IGBT elements Q1A and Q2A of step-up converter 12A, respectively.

The output voltage of charge/discharge unit 40 is applied to node N1 (step-up converter 12A). Controller 30 causes step-up converter 12B to operate as a voltage lowering circuit. As a result, it becomes possible to make the output voltage of step-up converter 12B substantially equal to the voltage VBB of battery BB.

After the end of step S4 or S6, at step S7, controller 30 determines, based on the voltage VBB detected by voltage sensor 10B, current value of battery BB detected by a current sensor (not shown in FIG. 1) and the like, whether SOC (State Of Charge) of battery BB has attained a prescribed value (for example, 80%) or not. If SOC of battery BB has reached the prescribed value (YES at step S7), the process proceeds to step S8, and otherwise (NO at step S7), the process of step S7 is executed repeatedly.

At step S8, controller 30 turns off system main relays SMR2B and SMR3B. Controller 30 may turn off system main relays SMR2B and SMR3B simultaneously, or it may turn off system main relays SMR2B and SMR3B in this order. When the process of step S8 is completed, the entire process ends.

As described above, in the present embodiment, the vehicle includes a power system that uses a plurality of batteries for driving motor generators and step-up converters for boosting battery voltage corresponding to respective batteries. The power system allows connection of a plurality of batteries having different battery characteristics (for example, storage capacity, output voltage and the like). According to the present embodiment, the batteries can be charged by utilizing step-up converters and, therefore, it becomes unnecessary to prepare a charge/discharge unit having a transformer (or a boosting circuit) therein.

Referring to FIG. 1, battery BB may be charged, for example, by inputting AC voltage from outside between neutral points of motor generators MG1 and MG2, with controller 30 controlling load circuit 23 and step-up converter 12B. In this case, however, power loss results in coils of motor generators MG1 and MG2, though the loss is very small.

Further, if battery BB is to be charged by directly connecting an AC power source (such as commercial power source for home use) to the neutral points of motor generators MG1 and MG2, it is possible that the voltage applied to battery BB is lower than the voltage necessary for charging battery BB. In that case, a boosting circuit for boosting the voltage from AC power source is necessary.

On the contrary, according to the present embodiment, the power source device is not connected to the neutral points of motor generators MG1 and MG2 and, therefore, loss in motor generators MG1 and MG2 at the time of battery charging can be prevented. Thus, high charging efficiency can be attained by the present embodiment.

Further, according to the present embodiment, the voltage from external power source is boosted by step-up converter 12A and, therefore, even if the voltage from external power source is low, the voltage necessary for charging battery BB can be obtained.

Further, according to the present embodiment, it is unnecessary to provide a circuit for controlling the charge/discharge current (voltage) or the boosting circuit in the charge/discharge unit. Therefore, equipment that becomes unnecessary when the vehicle runs need not be mounted on the vehicle. This reduces the number of components in the charging device and leads to better mileage.

Modification of Embodiment 1

Figure 5:
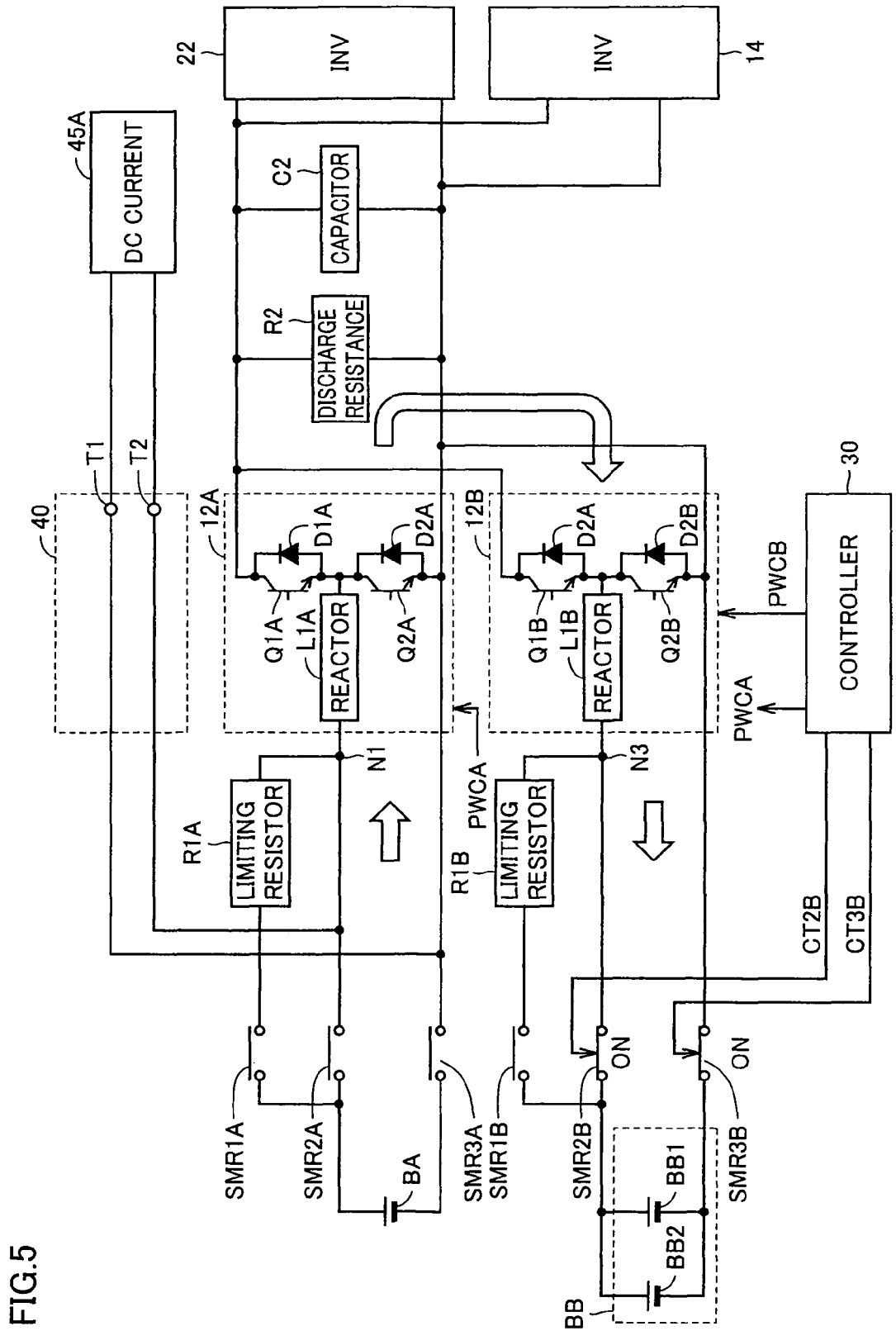
FIG. 5 shows a modification of Embodiment 1.

FIG. 5 shows a modification of Embodiment 1.

Referring to FIGS. 5 and 3, in the modification of Embodiment 1, a DC power source 45A is used as an external power source. As to the type of DC power source 45A, various types including lead storage battery and solar battery are available. The magnitude of output voltage of DC power source 45A is not specifically limited (by way of example, the output voltage may be DC 12V).

In the configuration shown in FIG. 5, the charge/discharge unit transmits the DC voltage from DC power source 45A to node N1. This makes rectifying element 41 unnecessary and, therefore, the number of components of the power source device can further be reduced.

Embodiment 2

Embodiment 2 allows each of a plurality of batteries to receive power from the outside (and to supply power to the outside). Main configuration of vehicle 100 in accordance with Embodiment 2 is the same as that of vehicle 100 shown in FIG. 1. Therefore, in the following, Embodiment 2 will be described with reference to a figure similar to FIG. 3, showing the configuration of vehicle 100 in a schematic manner. Though charging of a plurality of batteries will be described in the following, similar process is performed when power is taken out from the plurality of batteries.

Figure 6:
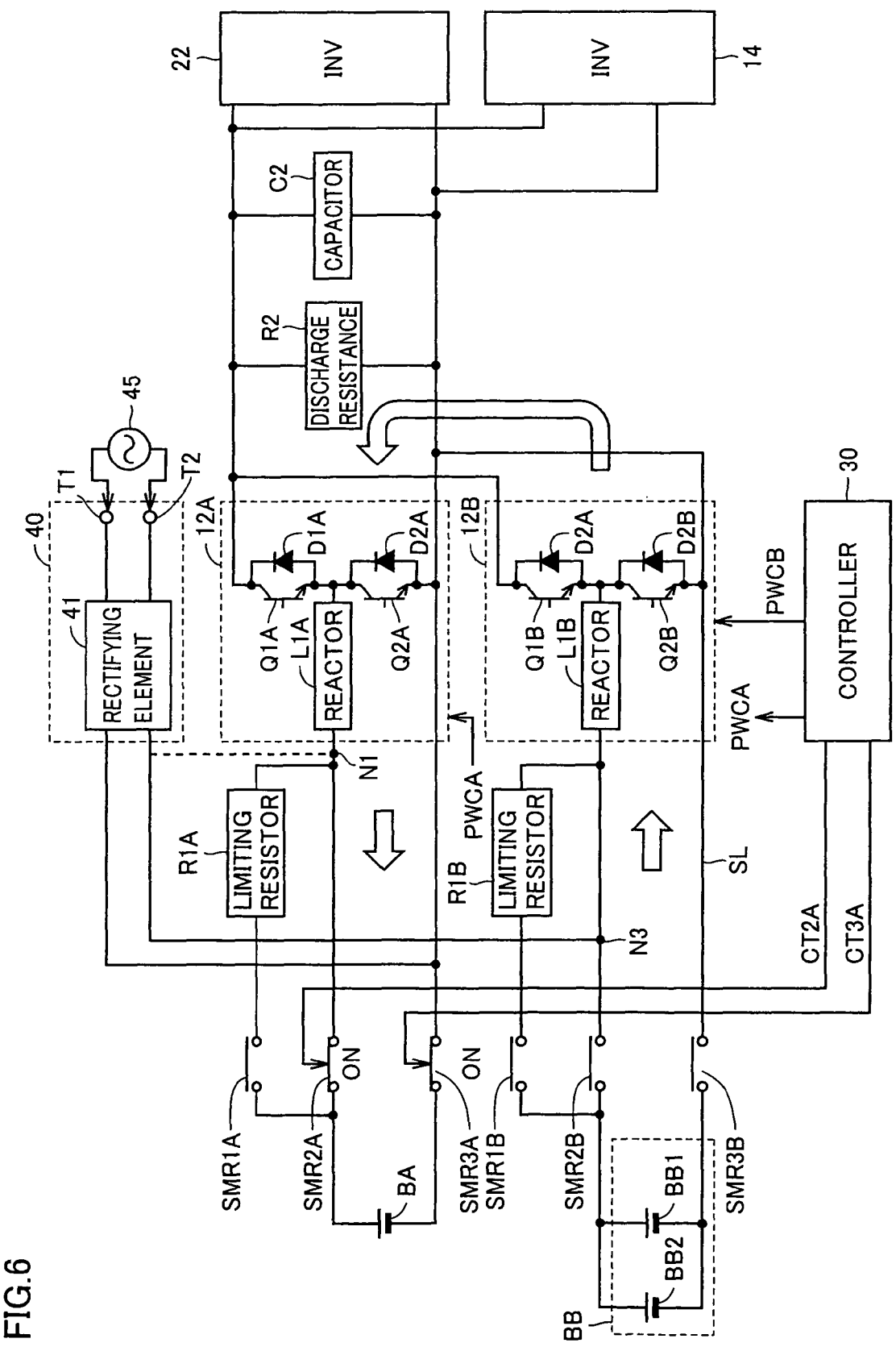
FIG. 6 schematically shows a method of charging both of batteries BA and BB in the power source device in accordance with Embodiment 2.

FIG. 6 shows, in a schematic manner, a method of charging both of batteries BA and BB in the power source device in accordance with Embodiment 2.

Referring to FIG. 6, charge/discharge unit 40 may be selectively connected to node N1 or node N3. Therefore, in Embodiment 2, destination of connection of charge/discharge unit 40 may be changed from node N1 to N3.

In Embodiment 2, first, charge/discharge unit 40 is first connected between node N1 and the ground line SL, to charge battery BB. Thereafter, charge/discharge unit 40 is connected between node N3 and the ground line SL, to charge battery BA.

When battery BA is charged, controller 30 transmits control signals CT2A and CT3A to system main relays SMR2A and SMR3A, respectively, to turn on system main relays SMR2A and SMR3A. Then, controller 30 operates step-up converter 12B. Thus, step-up converter 12B boosts the output voltage from charge/discharge unit 40 to the charging voltage of battery BA. Further, controller 30 controls step-up converter 12A to control unit 30, to turn on/off IGBT elements Q1A and Q2A, respectively. Thus, the electric power of AC power source 45 is transmitted to battery BA, and battery BA is charged.

According to Embodiment 2, even when the externally applied voltage is different from the charging voltage of each of the plurality of batteries (particularly if the voltage is lower than the charging voltage), the plurality of batteries can all be charged, by operating step-up converters 12A and 12B.

Modification of Embodiment 2

Figure 7:
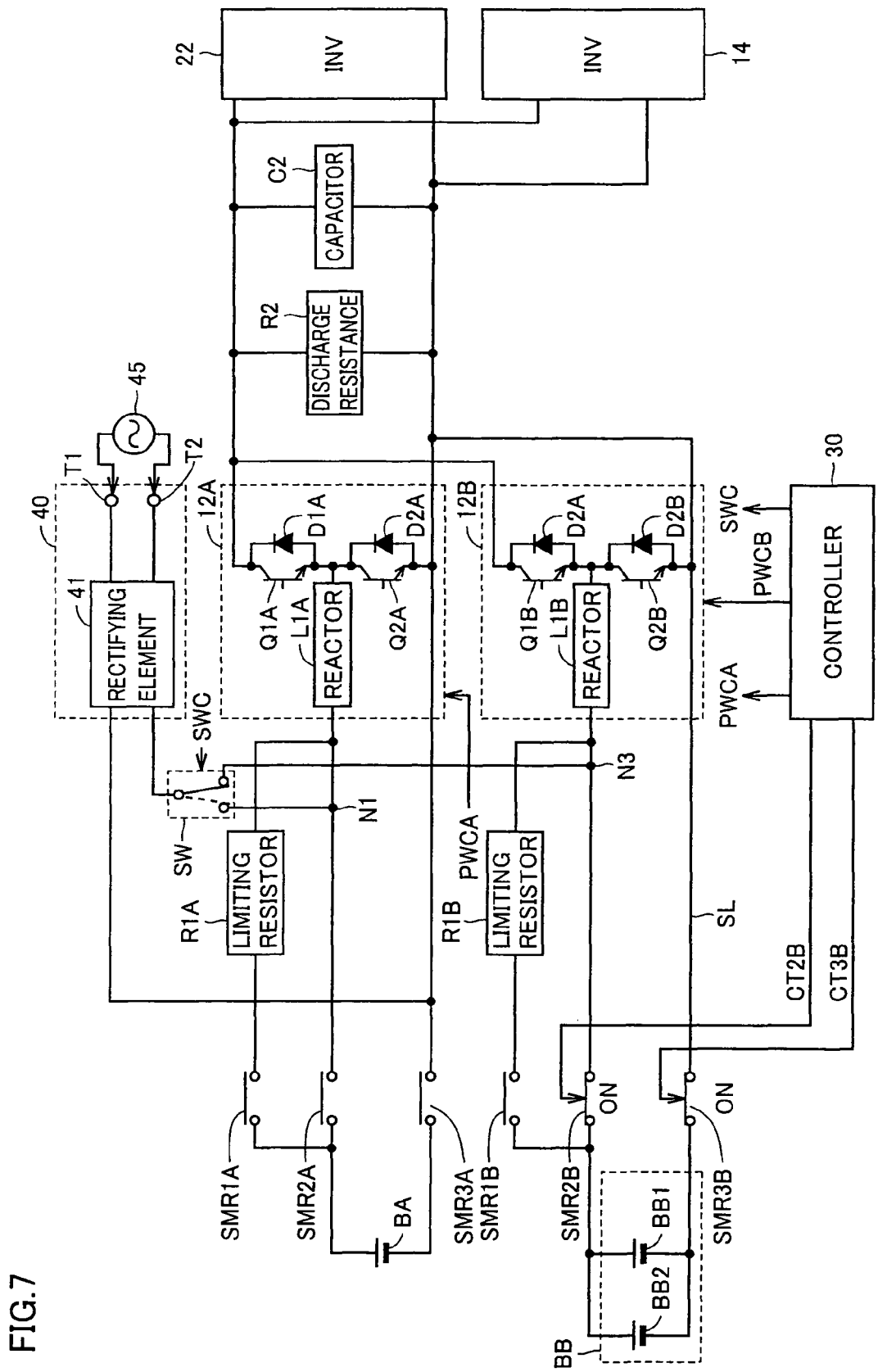
FIG. 7 shows a modification of Embodiment 2.

FIG. 7 shows a modification of Embodiment 2.

Referring to FIGS. 7 and 6, the modification of Embodiment 2 differs from the configuration of FIG. 6 in that it additionally includes a switch SW for selecting, from nodes N1 and N3, connection destination of one of the two output lines of charge/discharge unit 40, under the control by controller 30. Switch SW is controlled by a control signal SWC from controller 30. The other output line of charge/discharge unit 40 is connected to the ground line SL.

When the output line described above is connected to node N1, controller 30 sets system main relay SMR2B (SMR3B) to the connected state, and controls step-up converters 12A and 12B so that the voltage of node N3 is set to a desired charging voltage, whereby battery BB is charged. The charging process is the same as in Embodiment 1.

On the other hand, if the output line described above is connected to node N3 as shown in FIG. 7, controller 30 sets system main relay SMR2A (SMR3A) to the connected state, and controls step-up converters 12A and 12B such that the voltage of node N1 is set to a desired charging voltage, whereby battery BA is charged.

Figure 8:
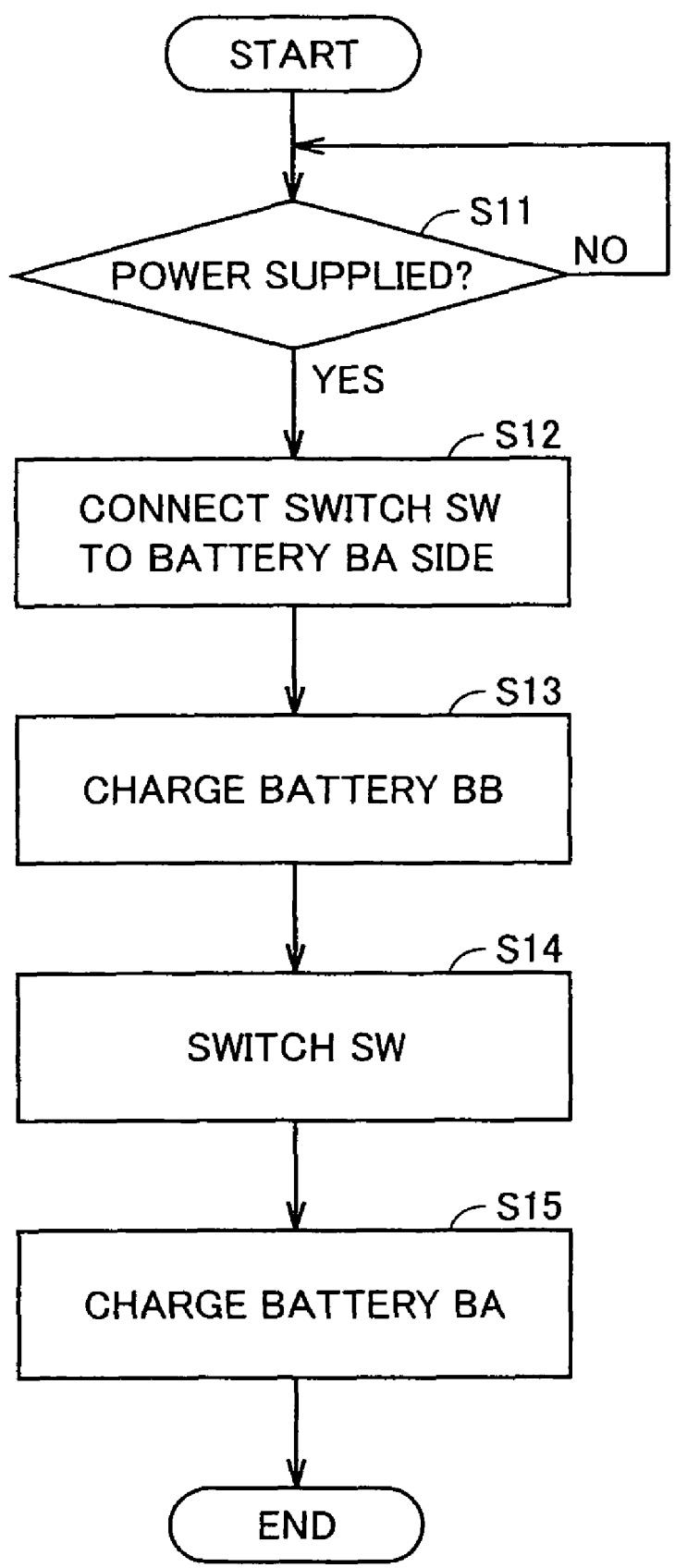
FIG. 8 is a flowchart representing a process for charging batteries BA and BB executed by controller 30 shown in FIG. 7.

FIG. 8 is a flowchart representing the process for charging batteries BA and BB executed by controller 30 shown in FIG. 7. The process of the flowchart is called from a prescribed main routine and executed at every prescribed time interval or every time prescribed conditions are satisfied.

Referring to FIGS. 8 and 7, when the process starts, at step S11, controller 30 determines whether there is power supply from AC power source 45. The process of step S11 is the same as that of step S1 shown in FIG. 4. If power is supplied from AC power source 45 (YES at step S11), the process proceeds to step S12 and, otherwise (NO at step S11), the control returns to step S11.

At step S12, controller 30 sends a control signal SWC to switch SW. Consequently, switch SW is connected to the side of battery BA. Specifically, two output lines of charge/discharge unit 40 are connected between node N1 and the ground line SL.

At step S13, controller 30 charges battery BB. The process for charging battery BB is the same as the process of steps S2 to S8 shown in FIG. 4.

Next, at step S14, controller 30 switches the connection destination of switch SW. Thus, the two output lines of charge/discharge unit 40 are connected between node N3 and the ground line SL.

Thereafter, at step S15, controller 30 performs the same process (the process of steps S2 to S8 shown in FIG. 4) as at the time of charging battery BB, to charge battery BA. When described in the comprehensive manner, the process at step S15 is as follows. Controller 30 transmits control signals CT2A and CT3A to system main relays SMR2A and 3A, respectively, to turn on system main relays SMR2A and 3A. Then, controller 30 operates step-up converter 12B to boost the voltage applied to step-up converter 12B (output voltage from charge/discharge unit 40). Controller 30 further controls step-up converter 12A to turn on and off IGBT elements Q1A and Q2A, respectively. Step-up converter 12A outputs the input voltage substantially intact. Battery BA is charged thereby. If SOC of battery BA attains to a prescribed value (for example, 80%), controller 30 turns off system main relays SMR2A and 3A, to terminate charging of battery BA.

When the process of step S15 ends, the overall process ends.

In this modification, controller 30 switches connection destination of charge/discharge unit 40 and, therefore, it is possible to charge a plurality of batteries while reducing labor required of the user for charging. It is noted that, by the arrangement of power source device shown in FIG. 3, battery BA cannot be charged if the output voltage of charge/discharge unit 40 is lower than the charging voltage of battery BA. In this modification, however, a plurality of batteries can be charged even in such a situation.

In a further modification, a plurality of batteries are charged without using a switch SW. The structure of vehicle main portion of this example is similar to that shown in FIG. 1.

In this modification, controller 30 charges battery BB in accordance with the flowchart shown in FIG. 4. It is noted, however, that the prescribed value at step S7 is made larger (for example, 85%), than the target value (for example, 80%) at the end of charging of both batteries BB and BA.

After the end of charging battery BB, controller 30 sets system main relay SMR2A to the connected state, and controls step-up converters 12A and 12B such that the power stored in battery BB is supplied to battery BA.

Since battery BB has larger storage capacity than battery BA, it is possible, by setting the prescribed value slightly higher than the target value, to apply power sufficient to attain target SOC value of battery BA from battery BB to battery BA.

According to this modification, even without switch SW of FIG. 7, batteries BA and BB can both be charged to prescribed states of charge by supplying power from battery BB to battery BA. Particularly, battery BB is charged by the power from external power source and battery BA is not charged by external power source and, therefore, it is possible to increase the capacity of the power source circuit as a whole chargeable by the external power source.

Embodiment 3

Figure 9:
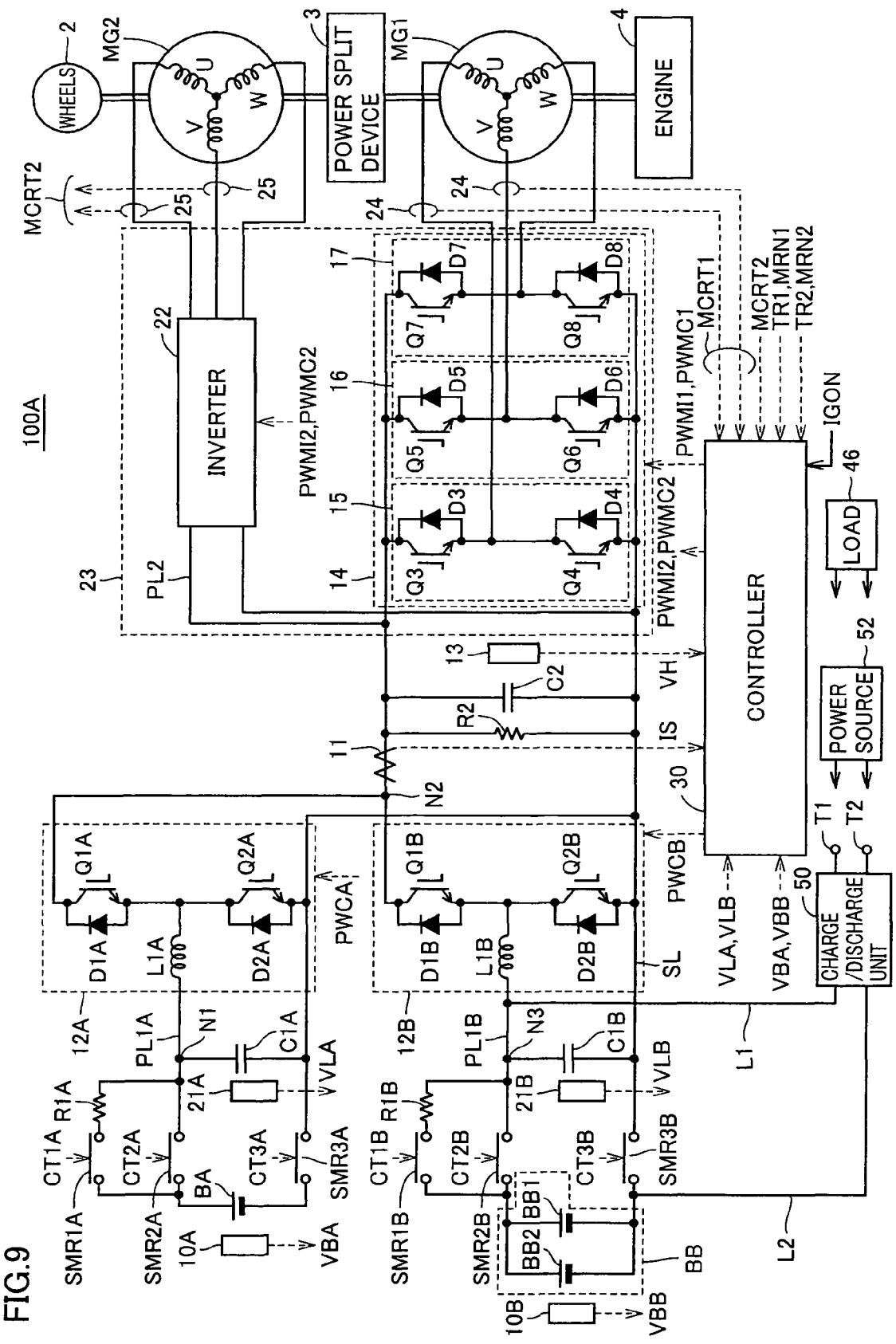
FIG. 9 shows a main configuration of a vehicle 100A in accordance with Embodiment 3.

FIG. 9 shows a main configuration of a vehicle 100A in accordance with Embodiment 3.

Referring to FIGS. 9 and 1, vehicle 100A is different from vehicle 100 in that it includes a charge/discharge unit 50 in place of charge/discharge unit 40.

Charge/discharge unit 50 includes an output line L1 connected to power line PL1B, and an output line L2 connected to a negative electrode of battery BB.

Charge/discharge unit 50 includes terminals T1 and T2 connected to power source device 52. Power source device 52 may be a DC power source or an AC power source. Further, charge/discharge unit 50 is formed to include a voltage step-up circuit. Further, a voltage equal to the charging voltage of battery BB may be input to charge/discharge unit 50. Therefore, the output voltage of power source device 52 is not specifically limited.

Further, as in Embodiments 1 and 2, a load 46 is connected to charge/discharge unit 50 in place of power source device 52, and load 46 may be driven by the power of battery BB.

Figure 10:
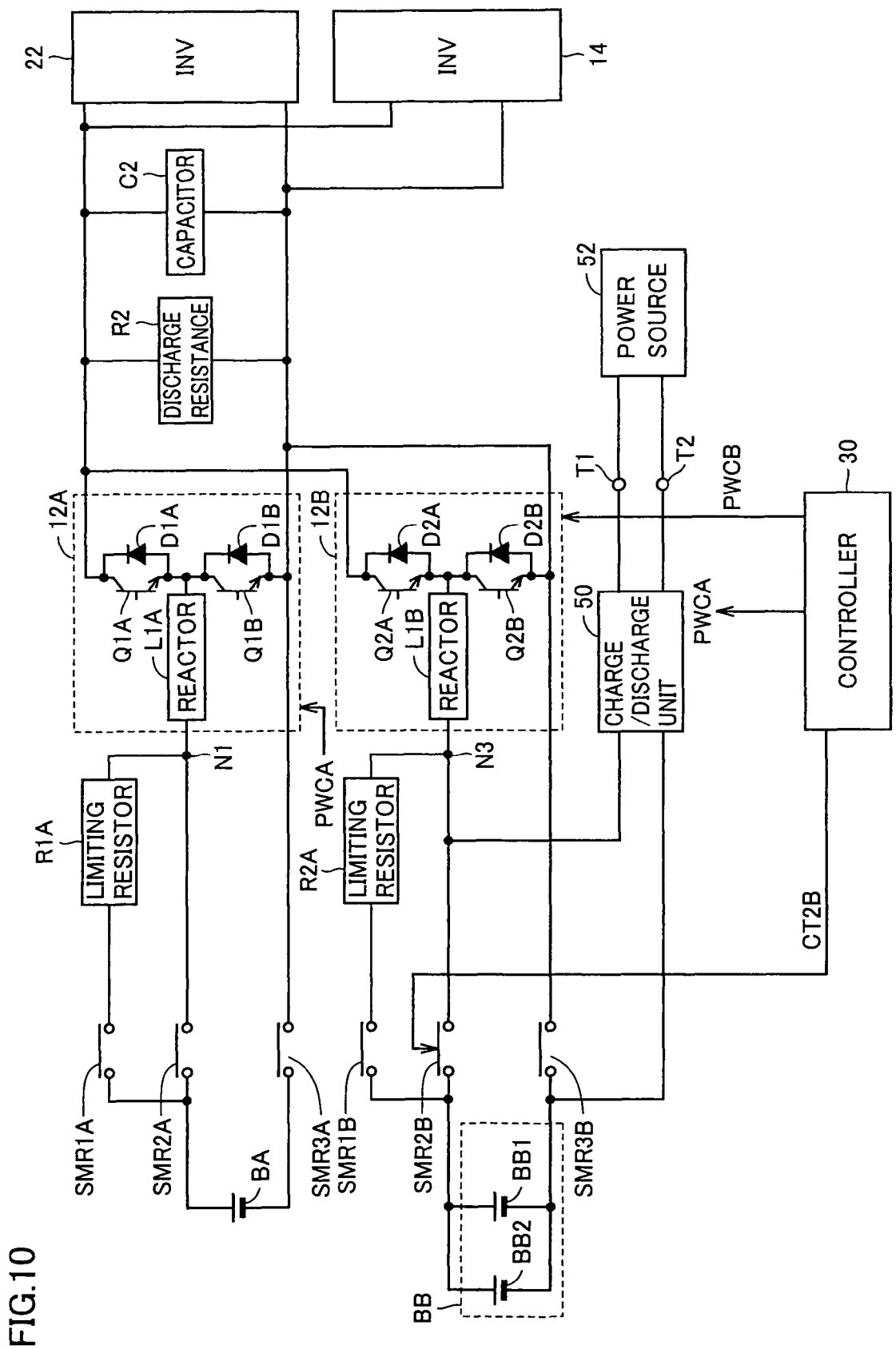
FIG. 10 schematically shows a state in which battery BB is charged, in vehicle 100A shown in FIG. 9.

FIG. 10 schematically shows a state when battery BB is charged in vehicle 100A of FIG. 9.

Referring to FIG. 10, controller 30 transmits a control signal CT2B to system main relay SMR2B, and turns on system main relay SMR2B. The voltage from power source device 52 is converted by charge/discharge unit 50 to the charging voltage of battery BB. Battery BB is charged thereby. At this time, system main relay SMR2A is off. Specifically, controller 30 sets system main relays SMR2B and SMR2A to connected state and shut-off state, respectively, to charge battery BB.

Figure 11:
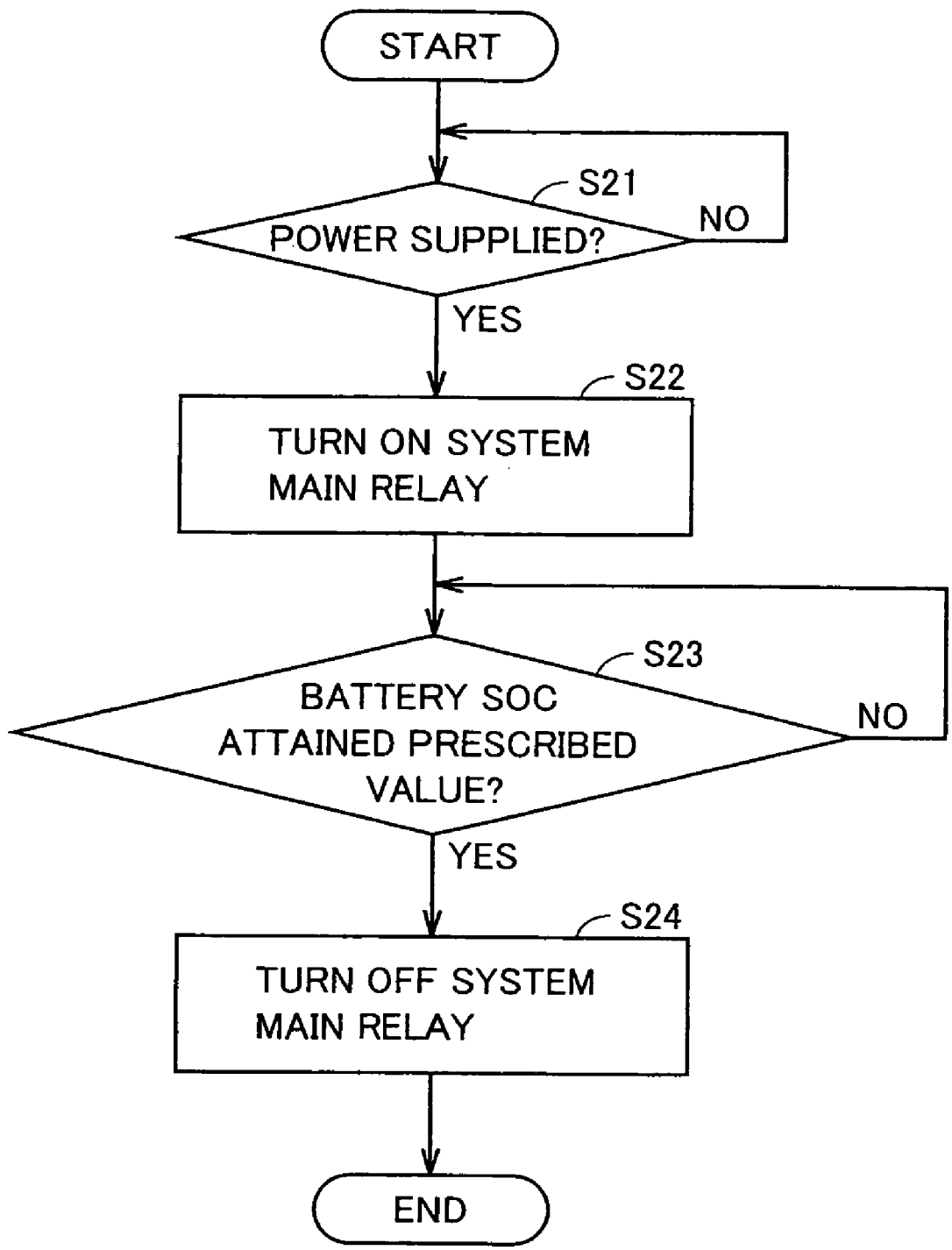
FIG. 11 is a flowchart representing a process for charging battery BB executed by controller 30.

FIG. 11 is a flowchart representing a process for charging battery BB executed by controller 30. The process of the flowchart is called from a prescribed main routine and executed at every prescribed time interval or every time prescribed conditions are satisfied.

Referring to FIGS. 11 and 10, when the process starts, at step S21, controller 30 determines whether there is power supply from external power source. The process of step S21 is the same as that of step S1 shown in FIG. 4.

If there is power supply from external power source (YES at step S21), the process proceeds to step S22, and otherwise (NO at step S21), the process returns to step S21.

At step S22, controller 30 turns on system main relay SMR2B. Controller 30 may turn on system main relay SMR1B and after the lapse of a prescribed time period, it may turn on system main relay SMR2B and turn off system main relay SMR1B. When the process of step S22 is executed, battery BB is charged.

At step S23, controller 30 determines whether SOC of battery BB has reached a prescribed value or not. If SOC of battery BB has reached the prescribed value (YES at step S23), the process proceeds to step S24, and if not (NO at step S23), the process of step S23 is executed repeatedly.

At step S24, controller 30 turns off system main relay SMR2B. When the process of step S24 ends, the overall process ends.

In Embodiment 3, it is possible to charge battery BB not through step-up converters 12A and 12B. In Embodiments 1 and 2, step-up converters 12A and 12B are operated and, therefore, though not large, there is a power loss when IGBT element is on, or there is a power loss resulting from switching of IGBT element. In contrast, in Embodiment 3, battery BB can be charged without operating step-up converters 12A and 12B and, therefore, such loss can be avoided. Therefore, loss at the time of charging can be reduced as compared with Embodiments 1 and 2.

Further, in Embodiment 3, battery BB can be charged simply by controller 30 controlling system main relay SMR2B. Therefore, the process of controller 30 can be simplified.

Further, charge/discharge unit 50 is connected to that one of batteries BA and BB which has larger storage capacity (that is, battery BB). Therefore, it becomes possible to charge battery BA using the power stored in battery BB.

When battery BA is charged, controller 30 transmits control signals PWCA and PWCB to step-up converters 12A and 12B, respectively. Consequently, IGBT elements Q1A and Q1B turn on. Here, though there is power loss generated in IGBT elements Q1A and Q1B, the loss in power source circuit as a whole can be reduced, as the charging time of battery BA is short.

It is noted that, as in Embodiment 2, charge/discharge unit 50 may be formed such that connection destination of output line L1 of charge/discharge unit 50 can be changed from node N1 to node N3. By such a method also, both batteries BA and BB can be charged.

First Modification of Embodiment 3

Figure 12:
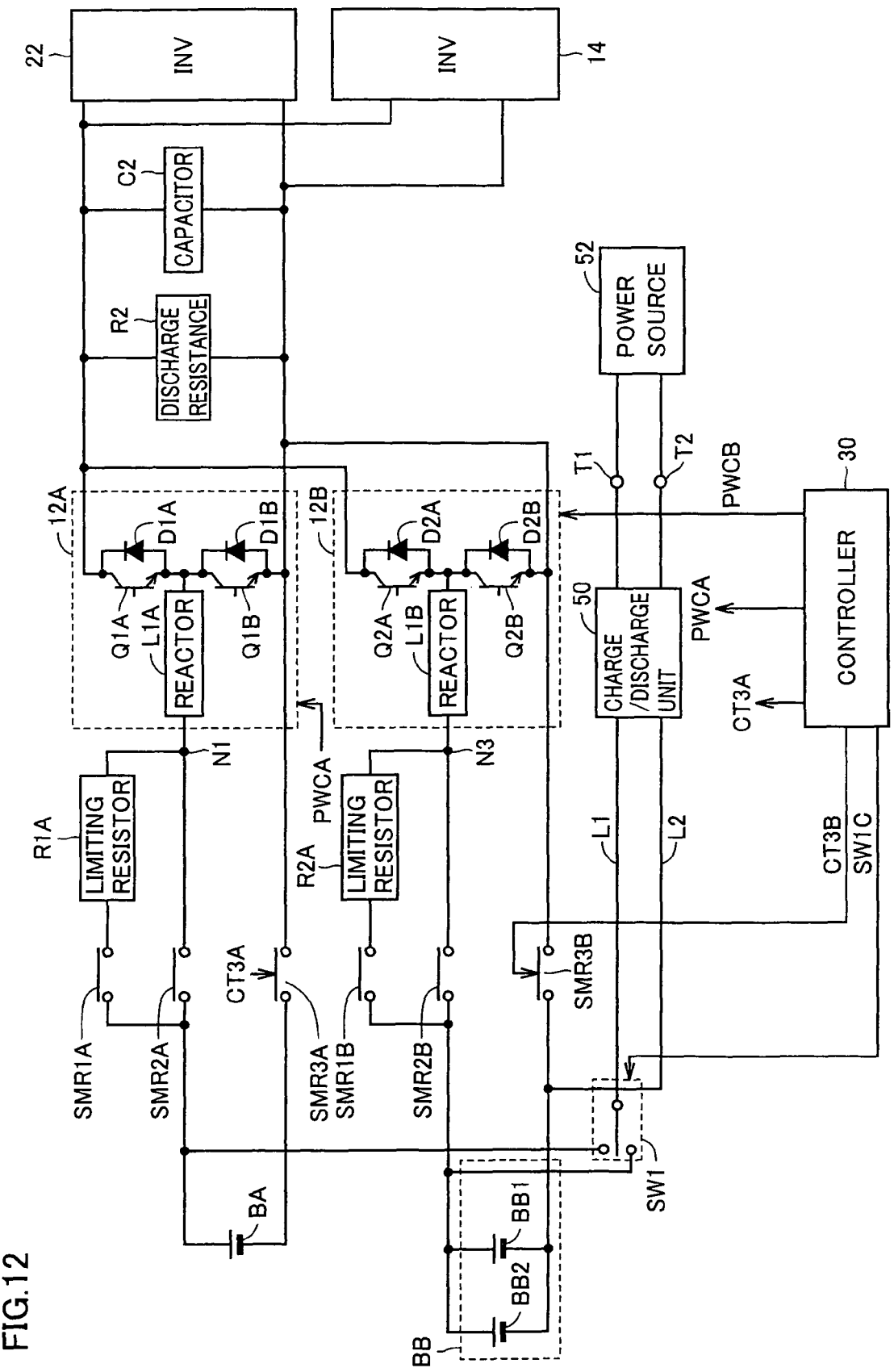
FIG. 12 shows a first modification of Embodiment 3.

FIG. 12 shows a first modification of Embodiment 3.

Referring to FIGS. 12 and 10, in the first modification, a switch SW1 is added, which selects the connection destination of output line L1 of charge/discharge unit 50 from positive electrode of battery BA and positive electrode of battery BB. In the first modification, controller 30 transmits control signal SW1C to switch SW1, to control switch SW1. Controller 30 realizes charging of both batteries BA and BB by controlling switch SW1, rather than system main relays. Therefore, by this modification, both batteries BA and BB can be charged without significantly increasing process load on controller 30.

Figure 13:
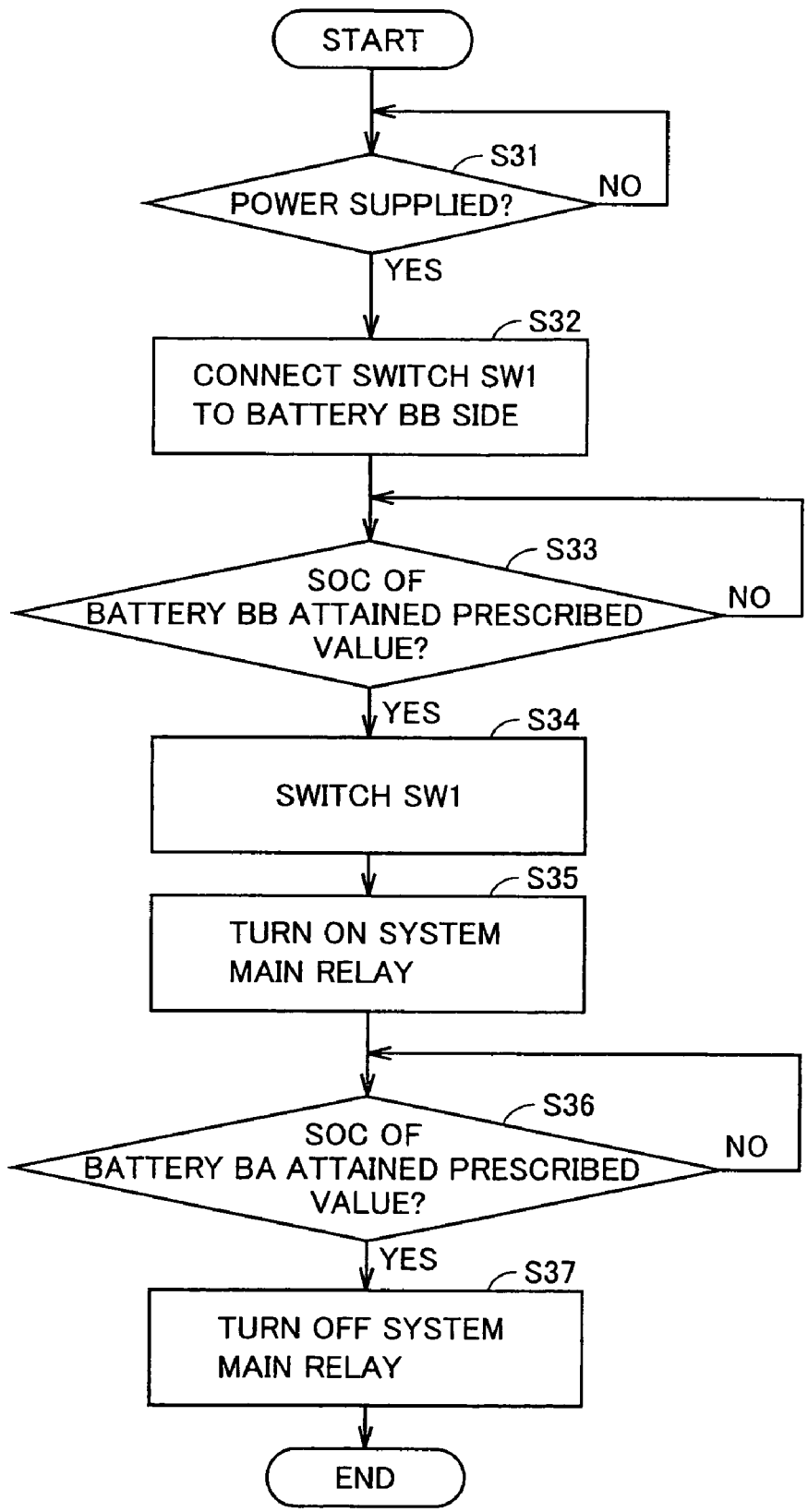
FIG. 13 is a flowchart representing a process for charging by controller 30 shown in FIG. 12.

FIG. 13 is a flowchart representing the process for charging by controller 30 shown in FIG. 12. The process of the flowchart is called from a prescribed main routine and executed at every prescribed time interval or every time prescribed conditions are satisfied.

Referring to FIGS. 13 and 12, when the process starts, at step S31, controller 30 determines whether there is power supply from power source device 52. The process at step S31 is the same as step S1 shown in FIG. 4.

If there is power supply from power source device 52 (YES at step S31), the process proceeds to step S32, and otherwise (NO at step S31), the process returns to step S31.

At step S32, controller 30 connects switch SW1 to the side of battery BB. Thus, battery BB is charged.

At step S33, controller 30 determines whether SOC of battery BB has reached a prescribed value. If SOC of battery BB has reached the prescribed value (YES at step S33), the process proceeds to step S34, and if not (NO at step S33), the process of step S33 is executed repeatedly.

At step S34, controller 30 switches the connection destination of switch SW1 to the side of battery BA.

Next, at step S35, controller 30 transmits control signals CT3A and CT3B to system main relays SMR3A and 3B, respectively, to turn on these system main relays. Thus, battery BA is charged.

At step S36, controller 30 determines whether or not SOC of battery BA has reached a prescribed value. If SOC of battery BA has not reached the prescribed value (NO at step S36), the process of step S36 is executed repeatedly. If SOC of battery BA has reached the prescribed value (YES at step S36), the process proceeds to step S37.

At step S37, controller 30 transmits control signals CT3A and CT3B to system main relays SMR3A and SMR3B, respectively, to turn off these system main relays. When the process of step S37 ends, the overall process ends.

As described above, according to the first modification, controller 30 switches the connection destination of charge/discharge unit 50 and, therefore, a plurality of batteries can be charged while reducing labor required of the user for charging.

Second Modification of Embodiment 3

Figure 14:
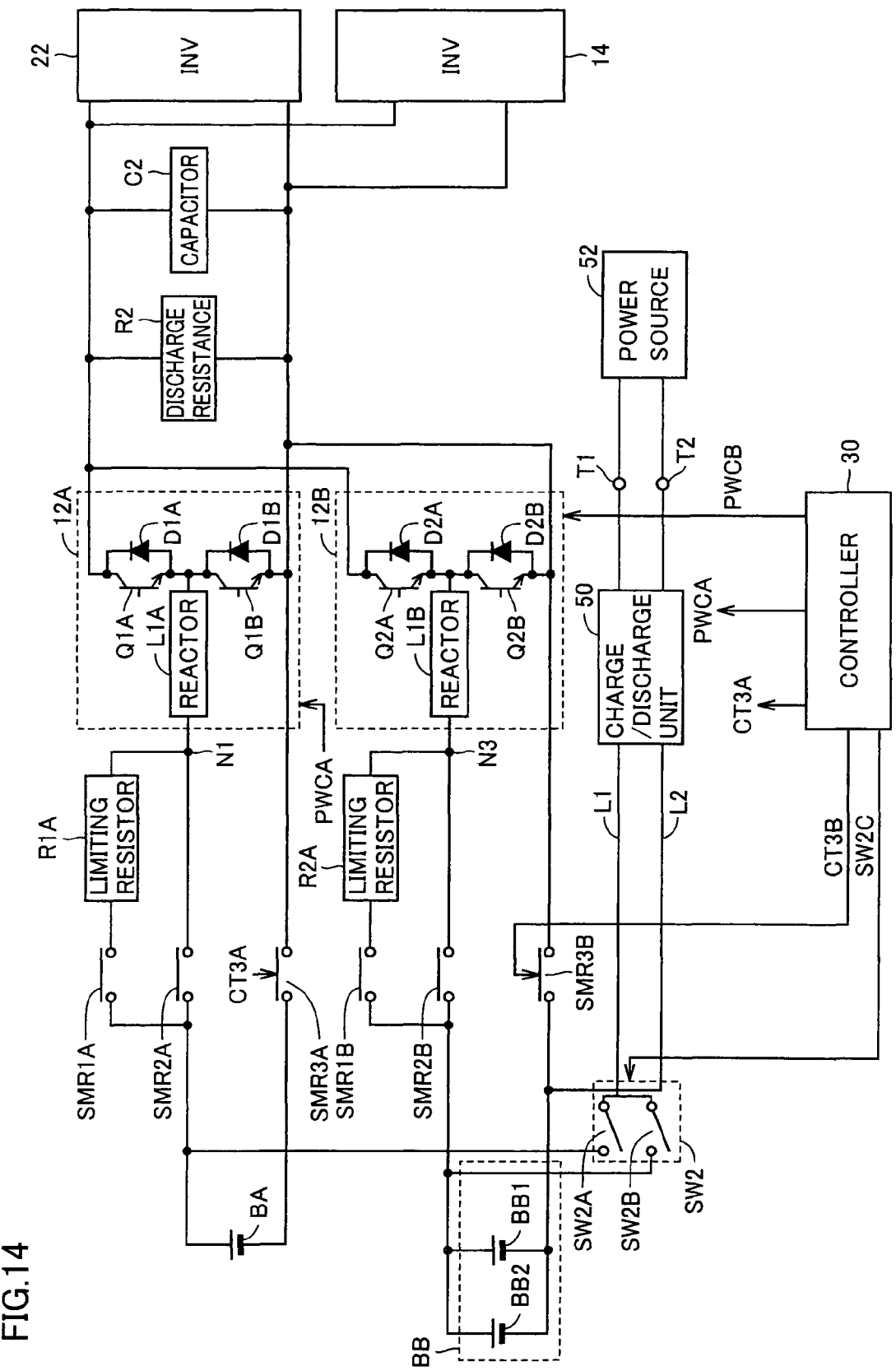
FIG. 14 shows a second modification of Embodiment 3.

FIG. 14 shows a second modification of Embodiment 3.

Referring to FIGS. 14 and 12, in the second modification, a switch SW2 is provided in place of switch SW1 included in the first modification. Switch SW2 includes switches SW2A and SW2B.

Switch SW2A is a switch for selecting connection/disconnection between output line L1 of charge/discharge unit 50 and positive electrode of battery BA. Switch SW2B is a switch for selecting connection/disconnection between output line L1 of charge/discharge unit 50 and positive electrode of battery BB.

Controller 30 transmits a control signal SW2C to switch SW2, to control each of switches SW2A and SW2B. Controller 30 can independently control switches SW2A and SW2B. Therefore, it is possible by switch SW2 to switch whether output line L1 of charge/discharge unit 50 is to be connected to both positive electrodes of batteries BA and BB.

FIG. 15 is a flowchart representing a process for charging by controller 30 shown in FIG. 14. The process of the flowchart is called from a prescribed main routine and executed at every prescribed time interval or every time prescribed conditions are satisfied.

Referring to FIGS. 15 and 14, when the process starts, at step S41, controller 30 determines whether there is power supply from power source device 52. The process of step S41 is the same as that of step S1 shown in FIG. 4.

If there is power supply from power source device 52 (YES at step S41), the process proceeds to step S42, and otherwise (NO at step S41), the process returns to step S41.

At step S42, controller 30 turns on the system main relays. Specifically, controller 30 transmits control signals CT3A and CT3B to system main relays SMR3A and SMR3B, respectively, to turn on these system main relays.

At step S43, controller 30 transmits control signal SW2C to switch SW2, to turn on both switches SW2A and SW2B, and thereby charges batteries BA and BB.

Here, since battery BA has smaller storage capacity than battery BB, it is expected that SOC of battery BA reaches a prescribed value faster than SOC of battery BB. Therefore, at step S44, controller 30 determines whether or not SOC of battery BA has reached the prescribed value. If SOC of battery BA has reached the prescribed value (YES at step S44), the process proceeds to step S45, and if not (NO at step S44), the process of step S44 is executed repeatedly.

At step S45, controller 30 turns off switch SW2A (and system main relay SMR3A on the side of battery BA), and terminates charging of battery BA.

At step S46, controller 30 determines whether or not SOC of battery BB has reached the prescribed value. If SOC of battery BB has reached the prescribed value (YES at step S46), the process proceeds to step S47, and if not (NO at step S46), the process of step S46 is executed repeatedly.

At step S47, controller 30 turns off the switch SW2B and system main relay SMR3B on the side of battery BB. Thus, charging of battery BB ends. When the process of step S47 ends, the overall process ends.

As described above, according to Modification 2, it becomes possible to provide a period in which both batteries BA and BB are charged. Therefore, the time necessary for charging batteries BA and BB can be made shorter. Further, as the switches SW2A and SW2B are provided corresponding to batteries BA and BB, respectively, and controller 30 controls switches SW2A and SW2B independently, it is possible to end charging of battery BA before the end of charging battery BB. Thus, overcharging of battery BA can be prevented. If battery BA is overcharged, life or performance of battery BA may be affected. In Modification 2, such a problem can be prevented.

It is noted that controller 30 may turn off switches SW2A and SW2B simultaneously, to end charging of batteries BA and BB simultaneously.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A power source device charged by an external power source, comprising:
a first power storage device chargeable and dischargeable, and connected to a first node;
a load connected to a second node;
a first voltage converting unit converting voltage between said first node and said second node;
a second power storage device chargeable and dischargeable, and connected to a third node;
a second voltage converting unit converting voltage between said third node and said second node;
a power transmitting unit transmitting power received from said external power source to said first node; and
a control unit controlling said first and second voltage converting units; wherein
said control unit controls said first and second voltage converting units such that voltage of said third node attains to a desired charging voltage and thereby charges said second power storage device.

2. The power source device according to claim 1, further comprising:
a first connecting unit capable of shutting off connection between said first power storage device and said first node; and
a second connecting unit capable of shutting off connection between said second power storage device and said third node; wherein
at the time of charging said second power storage device, said control unit sets said first and second connecting units to shut-off and connected states, respectively.

3. The power source device according to claim 2, wherein
said external power source is a DC power source; and
said power transmitting unit transmits a DC voltage from said DC power source to said first node.

4. The power source device according to claim 2, wherein
said external power source is an AC power source; and
said power transmitting unit includes
a converting circuit converting an AC voltage output from said AC power source to a DC voltage.

5. The power source device according to claim 2, wherein
said power transmitting unit is capable of selecting a connection destination from said first and third nodes; and
said control unit sets, when said power transmitting unit is connected to said third node, said first and second connecting units to connected and shut-off states, respectively, controls said first and second voltage converting units such that voltage of said first node attains to a desired charging voltage and thereby charges said first power storage device.

6. The power source device according to claim 5, further comprising
a switching unit controlled by said control unit to switch connection destination of said power transmitting unit between said first and third nodes.

7. The power source device according to claim 2, wherein
storage capacity of said first power storage device is smaller than that of said second power storage device.

8. The power source device according to claim 7, wherein
after charging of said second power storage device ends, said control unit sets said first connecting unit to the connected state and controls said first and second voltage converting units such that power stored in said second power storage device is supplied to said first power storage device, and thereby charges said first power storage device.

9. The power source device according to claim 2, wherein
said control unit sets said first and second connecting units to connected and shut-off states, respectively, and thereby charges said first power storage device.

10. The power source device according to claim 9, wherein
storage capacity of said first power storage device is larger than that of said second power storage device.

11. The power source device according to claim 10, wherein
each of said first and second power storage devices has a positive electrode and a negative electrode;
said first connecting unit connects the positive electrode of said first power storage device to said first node;
said second connecting unit connects the positive electrode of said second power storage device to said third node;
said power source device further comprising:
a ground line;
a third connecting unit connecting said ground line to the negative electrode of said first power storage device; and
a fourth connecting unit connecting said ground line to the negative electrode of said second power storage device; and
said power transmitting unit includes
a first output line connected to said first node, and
a second output line connected to the negative electrode of said first power storage device.

12. The power source device according to claim 2, wherein
an external load using power from at least one of said first and second power storage devices is connected to said power transmitting unit in place of said external power source; and said control unit sets at least one of said first and second connecting units to the selected state and thereby supplies power from the power storage device corresponding to said at least one connecting unit, of said first and second power storage devices, to said external load.

13. A power source device charged by an external power source, comprising:
a first power storage device chargeable and dischargeable, and connected to a first node;
an inverter connected to a second node and driving a motor for running a vehicle;
a first voltage converting unit converting voltage between said first node and said second node;
a second power storage device chargeable and dischargeable, and connected to a third node;
a second voltage converting unit converting voltage between said third node and said second node;
a first connecting unit capable of shutting off connection between said first power storage device and said first node;
a second connecting unit capable of shutting off connection between said second power storage device and said third node;
a power transmitting unit transmitting electric power from said external power source to its connection destination;
a switching unit switching said connection destination of said power transmitting unit between said first and third nodes; and
a control unit controlling said switching unit at the time of charging said first power storage device and at the time of charging said second power storage device, and setting said first and second connecting units both to the shut-off state.

14. A power source device charged by an external power source, comprising:
a first power storage device chargeable and dischargeable, and having a positive electrode connected to a first node;
a load connected to a second node;
a first voltage converting unit converting voltage between said first node and said second node;
a second power storage device chargeable and dischargeable, and having its positive electrode connected to a third node;
a second voltage converting unit converting voltage between said third node and said second node;
a power transmitting unit having a first output line and a second output line connected to a negative electrode of said first storage device, for transmitting power received from said external power source to its connection destination;
a first switching unit switching connection and disconnection between said first output line and said first node;
a second switching unit switching connection and disconnection between said first output line and said third node; and
a control unit controlling said first and second switching units; wherein
said control unit sets both said first and second switching units to the connected state, and thereby charges said first and second power storage devices.

15. The power source device according to claim 14, wherein
storage capacity of said first power storage device is larger than that of said second power storage device; and
when state of charge of said second power storage device attains to a prescribed state, said control unit sets said second switching unit to the disconnected state and ends charging of said second power storage device.

16. A vehicle, comprising
a power source device charged by an external power source provided outside said vehicle,
said power source device includes
a first power storage device chargeable and dischargeable, and connected to a first node;
a load connected to a second node;
a first voltage converting unit converting voltage between said first node and said second node;
a second power storage device chargeable and dischargeable, and connected to a third node;
a second voltage converting unit converting voltage between said third node and said second node;
a power transmitting unit transmitting power received from said external power source to said first node; and
a control unit controlling said first and second voltage converting units; wherein
said control unit controls said first and second voltage converting units such that voltage of said third node attains to a desired charging voltage and thereby charges said second power storage device.

17. The vehicle according to claim 16, wherein
said power source device further includes
a first connecting unit capable of shutting off connection between said first power storage device and said first node, and
a second connecting unit capable of shutting off connection between said second power storage device and said third node, and wherein
at the time of charging said second power storage device, said control unit sets said first and second connecting units to shut-off and connected states, respectively.

18. The vehicle according to claim 17, wherein
said external power source is a DC power source; and
said power transmitting unit transmits a DC voltage from said DC power source to said first node.

19. The vehicle according to claim 17, wherein
said external power source is an AC power source; and
said power transmitting unit includes
a converting circuit converting an AC voltage output from said AC power source to a DC voltage.

20. The vehicle according to claim 17, wherein
said power transmitting unit is capable of selecting a connection destination from said first and third nodes; and
said control unit sets, when said power transmitting unit is connected to said third node, said first and second connecting units to connected and shut-off states, respectively, controls said first and second voltage converting units such that voltage of said first node attains to a desired charging voltage and thereby charges said first power storage device.

21. The vehicle according to claim 20, wherein
said power source device further includes
a switching unit controlled by said control unit to switch connection destination of said power transmitting unit between said first and third nodes.

22. The vehicle according to claim 17, wherein
storage capacity of said first power storage device is smaller than that of said second power storage device.

23. The vehicle according to claim 22, wherein
after charging of said second power storage device ends, said control unit sets said first connecting unit to the connected state and controls said first and second voltage converting units such that power stored in said second power storage device is supplied to said first power storage device, and thereby charges said first power storage device.

24. The vehicle according to claim 17, wherein said control unit sets said first and second connecting units to connected and shut-off states, respectively, and thereby charges said first power storage device.

25. The vehicle according to claim 24, wherein storage capacity of said first power storage device is larger than that of said second power storage device.

26. The vehicle according to claim 25, wherein
each of said first and second power storage devices has a positive electrode and a negative electrode;
said first connecting unit connects the positive electrode of said first power storage device to said first node;
said second connecting unit connects the positive electrode of said second power storage device to said third node;
said power source device further including:
a ground line;
a third connecting unit connecting said ground line to the negative electrode of said first power storage device; and
a fourth connecting unit connecting said ground line to the negative electrode of said second power storage device; and
said power transmitting unit includes
a first output line connected to said first node, and
a second output line connected to the negative electrode of said first power storage device.

27. The vehicle according to claim 17, wherein
an external load using power from at least one of said first and second power storage devices is connected to said power transmitting unit in place of said external power source; and
said control unit sets at least one of said first and second connecting units to the selected state and thereby supplies power from the power storage device corresponding to said at least one connecting unit, of said first and second power storage devices, to said external load.

28. A vehicle, comprising:
a power source device charged by an external power source provided outside said vehicle,
said power source device includes
a first power storage device chargeable and dischargeable, and connected to a first node;
an inverter connected to a second node and driving a motor for running the vehicle;
a first voltage converting unit converting voltage between said first node and said second node;
a second power storage device chargeable and dischargeable, and connected to a third node;
a second voltage converting unit converting voltage between said third node and said second node;
a first connecting unit capable of shutting off connection between said first power storage device and said first node;
a second connecting unit capable of shutting off connection between said second power storage device and said third node;
a power transmitting unit transmitting electric power from said external power source to its connection destination;
a switching unit switching said connection destination of said power transmitting unit between said first and third nodes; and
a control unit controlling said switching unit at the time of charging said first power storage device and at the time of charging said second power storage device, and setting said first and second connecting units both to the shut-off state.

29. A vehicle, comprising:
a power source device charged by an external power source provided outside said vehicle,
said power source device including:
a first power storage device chargeable and dischargeable, and having a positive electrode connected to a first node;
a load connected to a second node;
a first voltage converting unit converting voltage between said first node and said second node;
a second power storage device chargeable and dischargeable, and having its positive electrode connected to a third node;
a second voltage converting unit converting voltage between said third node and said second node;
a power transmitting unit having a first output line and a second output line connected to a negative electrode of said first storage device, for transmitting power received from said external power source to its connection destination;
a first switching unit switching connection and disconnection between said first output line and said first node;
a second switching unit switching connection and disconnection between said first output line and said third node; and
a control unit controlling said first and second switching units; wherein
said control unit sets both said first and second switching units to the connected state, and thereby charges said first and second power storage devices.

30. The vehicle according to claim 29, wherein
storage capacity of said first power storage device is larger than that of said second power storage device; and
when state of charge of said second power storage device attains to a prescribed state, said control unit sets said second switching unit to the disconnected state and ends charging of said second power storage device.

31. The power source device according to claim 1, wherein
said load includes an inverter converting voltage of said second node and supplying it to a motor running a vehicle; and
at the time of charging said second power storage device, said control unit controls said first and second voltage converting units such that said first voltage converting unit steps up voltage of said first node and said second voltage converting unit steps down voltage of said second node, and at the time of running of said vehicle, said control unit controls said first voltage converting unit such that voltages of said first and second nodes are converted to each other and controls said second voltage converting units such that voltages of said second and third nodes are converted to each other.

32. The vehicle according to claim 16, wherein
said load includes an inverter converting voltage of said second node and supplying it to a motor running a vehicle; and
at the time of charging said second power storage device, said control unit controls said first and second voltage converting units such that said first voltage converting unit steps up voltage of said first node and said second voltage converting unit steps down voltage of said second node, and at the time of running of said vehicle, said control unit controls said first voltage converting unit such that voltages of said first and second nodes are converted to each other and controls said second voltage converting units such that voltages of said second and third nodes are converted to each other.

* * * * *